United States Patent
Kato

(10) Patent No.: US 7,903,272 B2
(45) Date of Patent: Mar. 8, 2011

(54) DATA PROCESSING APPARATUS, PRINT SETTING ADJUSTING METHOD, RECORDING MEDIUM STORING COMPUTER-READABLE PROGRAM THEREIN, AND PROGRAM

(75) Inventor: Hisashi Kato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1140 days.

(21) Appl. No.: 11/271,871

(22) Filed: Nov. 14, 2005

(65) Prior Publication Data

US 2006/0103867 A1    May 18, 2006

(30) Foreign Application Priority Data

Nov. 15, 2004   (JP) ................. 2004-330474

(51) Int. Cl.
 *G06F 3/12* (2006.01)
(52) U.S. Cl. ....... 358/1.15; 358/1.1; 358/1.13; 358/1.14; 710/1; 719/321
(58) Field of Classification Search ............. 358/1.13, 358/1.1, 3–3.25, 3.26–3.27, 3.28, 3.29–3.32; 355/38, 35, 32, 83, 115, 18, 22, 88; 399/223, 399/222, 28, 39, 54, 112, 178, 184, 298, 399/321, 344; 707/500–542; 710/1; 719/321
See application file for complete search history.

(56) References Cited

U.S. PATENT DOCUMENTS

| | | | | |
|---|---|---|---|---|
| 6,661,530 | B1 * | 12/2003 | Munetomo et al. | 358/1.15 |
| 2002/0065807 | A1 * | 5/2002 | Kawamoto et al. | 707/1 |
| 2002/0161936 | A1 * | 10/2002 | Minagawa | 710/1 |
| 2003/0076512 | A1 * | 4/2003 | Laughlin | 358/1.2 |
| 2003/0079063 | A1 | 4/2003 | Iida et al. | 710/8 |
| 2004/0212829 | A1 * | 10/2004 | Uchida | 358/1.15 |
| 2004/0216144 | A1 * | 10/2004 | Mitsui | 719/321 |
| 2005/0088701 | A1 * | 4/2005 | Uchida et al. | 358/3.28 |

FOREIGN PATENT DOCUMENTS

JP   2001-075758   3/2001
JP   2002-108580   4/2002

* cited by examiner

*Primary Examiner* — Benny Q Tieu
*Assistant Examiner* — Martin Mushambo
(74) *Attorney, Agent, or Firm* — Fitzpatrick, Cella, Harper & Scinto

(57) ABSTRACT

There is provided a control program which allows a computer to execute a setting processing method having: an obtainment step of respectively obtaining conflict rules showing rules for avoiding conflict of setting values which are used in a plurality of print processes that are used in a first expanding function program to expand a function of a print processing related program and a second expanding function program to expand the function of the print processing related program; and a discrimination step of discriminating the presence or absence of conflict between setting values of print settings which are used in the first expanding function program and the second expanding function program by using the conflict rules obtained in the obtainment step.

11 Claims, 15 Drawing Sheets

FIG. 14A

| PAGE SETTING | FINISH | SETTING OF PLUG-IN 1 | SETTING OF PLUG-IN 2 |

☐ DUPLEX PRINTING ~103  ○ SORT ~101
☑ POSTER ~104  ⦿ GROUP ~102

[OK]  [CANCEL]  [APPLY]

| PAGE SETTING | FINISH | SETTING OF PLUG-IN 1 | SETTING OF PLUG-IN 2 |

☐ DUPLEX PRINTING ~103  ○ SORT ~101
☐ POSTER ~104  ⦿ GROUP ~102

[OK]  [CANCEL]  [APPLY]

| PAGE SETTING | FINISH | SETTING OF PLUG-IN 1 | SETTING OF PLUG-IN 2 |

☐ DUPLEX PRINTING ~103  ⦿ SORT ~101
☐ POSTER ~104  ○ GROUP ~102

[OK]  [CANCEL]  [APPLY]

~100

DATA PROCESSING APPARATUS, PRINT SETTING ADJUSTING METHOD, RECORDING MEDIUM STORING COMPUTER-READABLE PROGRAM THEREIN, AND PROGRAM

BACKGROUND OF THE INVENTION

1. Field of the Invention

The invention relates to a data processing apparatus which can further add an expanding function to a plurality of functions that can be realized by a print processing related program, a print setting adjusting method, a storing medium in which a computer-readable program has been stored, and its program.

2. Related Background Art

Hitherto, as release forms of an installation set of a printer driver from a hardware vendor which manufactures devices such as a printer and the like, there are a case where the installation set is packaged upon shipping of the device, a case where a site of each vendor is opened and the user freely downloads the printer driver and uses it, and the like. Although the printer driver released along such a path is used in various environments, there are many demands for realizing a certain specific function by the printer driver among a variety of use environments. Particularly, in an enterprise environment such as a large enterprise or the like, such a tendency is increasing.

In such a background, in recent years, a printer driver which realizes the addition of the specific function in the plug-in format has been proposed. The function expansion of the printer driver in the plug-in format denotes a method of realizing the function addition by providing a differential module, that is, the plug-in separately from the installation set of the printer driver distributed from a printer vendor.

For example, there has been disclosed a technique regarding a data processing apparatus in which a module group (plug-in) which is installed into the printer driver for controlling an output apparatus is determined in accordance with the print function set by the user, thereby reducing redundancy, suppressing a lack of memory capacity, and realizing the simplification of a print process and the improvement of a print speed (for example, refer to Japanese Patent Application Laid-Open No. 2002-108580).

In the function expansion system in the plug-in format, besides the example of the functions as mentioned above, the plug-in of various functions as well as the functions regarding the security have been developed. However, there is a case where such a plurality of different functions are added to the same driver. In such an environment, in order to allow the user to use the plurality of additional functions, there is a case where a user interface (UI) sheet that is unique to the additional functions is added onto the UI of the printer driver of an adding destination side, thereby enabling the user to set the additional functions.

At this time, in the case where the user changes the settings of the additional functions or changes the settings which can be set by the original printer driver, the situation where a conflict occurs between the settings is considered.

Even in the case where the setting change of the additional functions is not realized by the UI, the situation where conflict with other setting values occurs by realizing the additional functions is considered. Before the additional functions are added, when a setting change environment (UI) is provided for the user by a print setting sheet, the printer driver enables only the setting-possible items to be set in accordance with the setting change by the user so that no conflict occurs between the settings, thereby disabling the setting-impossible items (items in which the conflict occurs) to be set. A process to prevent the conflict between the settings from occurring in the print setting in the printer driver as mentioned above is called a conflict process (refer to Japanese Patent Application Laid-Open No. 2002-108580 and No. 2001-75758).

SUMMARY OF THE INVENTION

Each of a plurality of modules added in the plug-in format is unknown to the printer driver as an example of a print processing related program. It is, therefore, an object of the invention to provide a mechanism which can discriminate whether or not a conflict has occurred between setting values of the print processing related program and the expanding program.

For example, there is disclosed a setting processing method comprising: an obtaining step of respectively obtaining conflict rules showing rules to avoid conflict of setting values which are used for a plurality of print processes which are used in a first expanding function program to expand functions of a print processing related program and a second expanding function program to expand the functions of the print processing related program; and a discriminating step of discriminating the presence or absence of conflict between the setting values of print settings which are used in the first expanding function program and the second expanding function program by using the conflict rules obtained in the obtaining step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 14A, 14B and 14C are diagrams showing an example of print setting sheets in the data processing apparatus according to the invention.

DETAILED DESCRIPTION OF THE PREFERRED EMBODIMENTS

Figure 1:
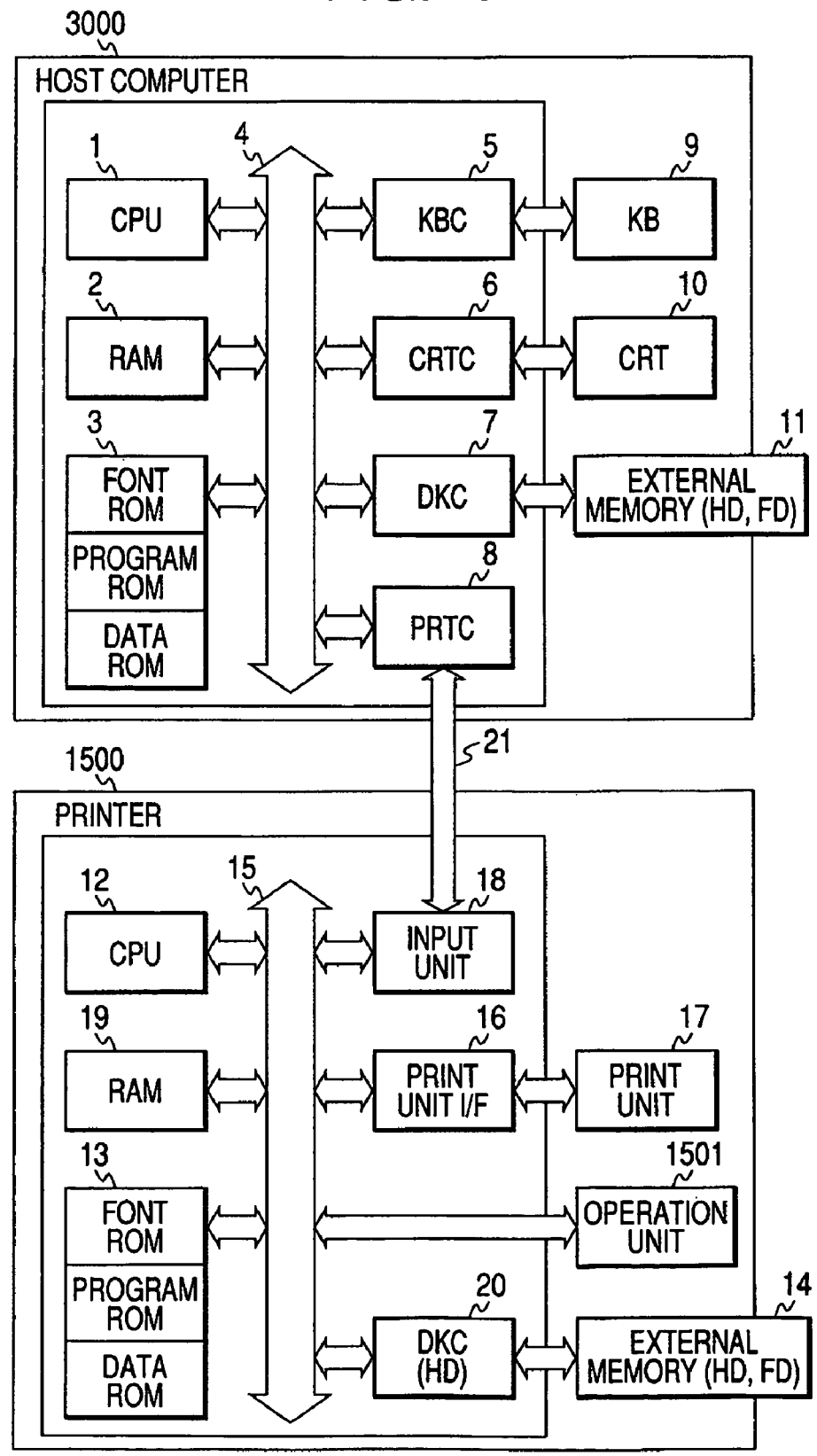
FIG. 1 is a block diagram for explaining a construction of a print processing system to which a data processing apparatus showing the first embodiment of the invention can be applied.

A data processing apparatus according to the invention which accomplishes the above object has the following construction.

A data processing apparatus which can further add a plurality of expanding functions to a function that can be realized by a print processing related program, comprises:

a first rule storage unit adapted to store a first conflict processing rule which has been determined in accordance with a dependence relation that is satisfied between two or more setting values;

a second rule storage unit adapted to store a second conflict processing rule which has been determined in accordance with a dependence relation that is satisfied between the setting values which are inputted to the function of the print processing related program and to the plurality of expanding functions; and a setting adjustment unit adapted to read the first conflict processing rule and the second conflict processing rule from the first rule storage unit and the second rule storage unit and execute an adjusting process of the setting values on the basis of the read first and second conflict processing rules so that no conflict occurs between any two settings of the plurality of functions and the plurality of expanding functions.

A print setting adjusting method of the invention which accomplishes the above object has the following construction.

A print setting adjusting method in a data processing apparatus which has a first rule storage unit adapted to store a first conflict processing rule that has been determined in accordance with a dependence relation that is satisfied between two or more setting values and a second rule storage unit adapted to store a second conflict processing rule that has been determined in accordance with a dependence relation that is satisfied between the setting values that are inputted to the function of a print processing related program and to a plurality of expanding functions, and which can further add the plurality of expanding functions to a function that can be realized by the print processing related program, comprising a setting adjustment step of reading out the first conflict processing rule and the second conflict processing rule from the first rule storage unit and the second rule storage unit and executing an adjusting process of the setting values on the basis of the read first and second conflict processing rules so that no conflict occurs between any two settings of the plurality of functions and the plurality of expanding functions.

According to the invention, even in a data processing environment in which the plurality of new functions have been added in the plug-in format to the print processing related program (printer driver), the inconsistent state accompanied by each of the function unique settings is discriminated and the automatic and accurate conflict process is realized. Even when the function unique settings are in the inconsistent state, the environment is automatically adjusted to the print setting environment in which the normal printing can be executed, the print setting to a plurality of added functions is normally performed, and the print setting environment in which the desired print result can be normally obtained can be freely constructed.

The best mode for carrying out the invention will now be described with reference to the drawings.

<Description of System Construction>

Preferred embodiments of the invention will be described in detail hereinbelow with reference to the drawings.

FIG. 1 is a block diagram for explaining a construction of a print processing system to which a data processing apparatus showing the first embodiment of the invention can be applied. Naturally, the invention can be applied to any of a sole apparatus, a system comprising a plurality of apparatuses, and a system in which apparatuses are connected through a network such as LAN, WAN, or the like and processes are executed so long as the functions of the invention are executed unless otherwise specified.

In FIG. 1, reference numeral 3000 denotes a host computer having a CPU 1 to execute processes of a document in which a figure, an image, characters, a table (including a spreadsheet or the like), and the like exist mixedly, on the basis of a document processing program or the like stored in a program ROM in a ROM 3 or an external memory 11. The CPU 1 integratedly controls devices connected to a system bus 4.

An operating system program (hereinafter, referred to as "OS") or the like as a control program of the CPU 1 is stored in the program ROM in the ROM 3 or the external memory 11. Font data or the like which is used in the above document processes is stored in a font ROM in the ROM 3 or the external memory 11. Various kinds of data which is used in the case of executing the above document processes or the like is stored in a data ROM in the ROM 3 or the external memory 11.

Reference numeral 2 denotes a RAM which functions as a main memory, a work area, or the like for the CPU 1; 5 a keyboard controller (KBC) for controlling a key input from a keyboard (KB) 9 or a pointing device (not shown); 6 a CRT controller (CRTC) for controlling a display of a CRT display (CRT) 10; and 7 a disk controller (DKC) for controlling an access to the external memory 11 such as hard disk (HD), flexible disk (FD), or the like to store a boot program, various applications, font data, a user file, an edition file, a printer control command forming program (hereinafter, referred to as a printer driver), and the like.

Reference numeral 8 denotes a printer controller (PRTC) which is connected to a printer 1500 through a predetermined bidirectional interface (I/F) 21 and executes a communication control process with the printer 1500. The CPU 1 executes, for example, a developing (rasterizing) process of an outline font into a display information RAM set on the RAM 2 and enables "WYSIWYG" on the CRT 10.

The CPU 1 opens various registered windows and executes various data processes on the basis of a command instructed by a mouse cursor (not shown) or the like on the CRT 10. When the printing is executed, the user opens the window regarding the print setting and can set a print processing method for the printer driver including the setting of the printer and selection of a print mode.

In the printer 1500, reference numeral 12 denotes a printer CPU which outputs an image signal as output information to a print unit (printer engine) 17 connected to a system bus 15 on the basis of a control program or the like stored in a program ROM stored in a ROM 13 or a control program or the like stored in an external memory 14.

A control program or the like of the CPU 12 is stored in the program ROM in the ROM 13. Font data or the like which is used when the output information is formed is stored in a font ROM in the ROM 13. In the case of a printer which does not have the external memory 14 such as a hard disk or the like, information or the like which is used on the host computer has been stored in a data ROM in the ROM 13.

The CPU 12 can communicate with the host computer through an input unit 18 and notify the host computer 3000 of the information or the like in the printer. Reference numeral 19 denotes an RAM which functions as a main memory, a work area, or the like of the CPU 12. The RAM 19 is constructed so that its memory capacity can be expanded by an option RAM which is connected to an expansion port (not shown).

The RAM 19 is used for an output information rasterizing area, an environmental data storing area, an NVRAM, or the like. An access to the external memory 14 such as hard disk (HD), IC card, or the like mentioned above is controlled by a disk controller (DKC) 20. The external memory 14 is connected as an option and stores font data, an emulation program, form data, and the like. Reference numeral 1501 denotes an operation panel on which switches for the operation, an LED display, and the like are arranged.

As for the external memory mentioned above, the number of external memories is not limited to one but it can be also constructed in such a manner that the apparatus has at least one or more external memories and, in addition to built-in fonts, a plurality of option font cards and a plurality of external memories in which programs to interpret printer control languages of different language systems have been stored can be connected. Further, it is also possible to construct in such a manner that the apparatus has an NVRAM (not shown) and printer mode setting information from the operation panel 1501 is stored in the NVRAM.

Further, although an example in which the "WINDOWS (registered trademark)" made by Microsoft Corporation is used as an OS will be explained in the embodiment, the invention can be also applied to OSs other than "WINDOWS".

Figure 2:
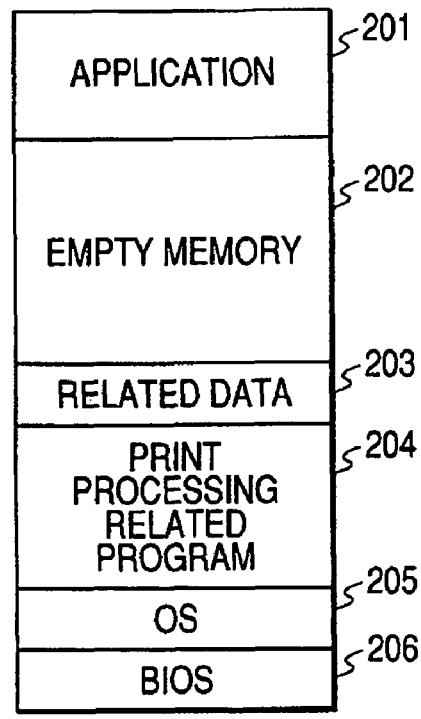
FIG. 2 is a diagram showing an example of a memory map in a RAM shown in FIG. 1.

FIG. 2 is a diagram showing an example of a memory map in the RAM 2 shown in FIG. 1. The diagram shows the memory map in the RAM 2 in the state where a predetermined application and a print processing related program have been activated and loaded into the RAM 2 in the host computer 3000.

In FIG. 2, as shown in the diagram, in addition to a BIOS 206 and an OS 205, an application 201, a print processing related program 204, and related data 203 have been loaded in the RAM 2. Further, an empty memory area (empty memory) 202 is also assured therein. Thus, the application 201 and the print processing related program 204 are in the state where they can be executed.

Figure 3:
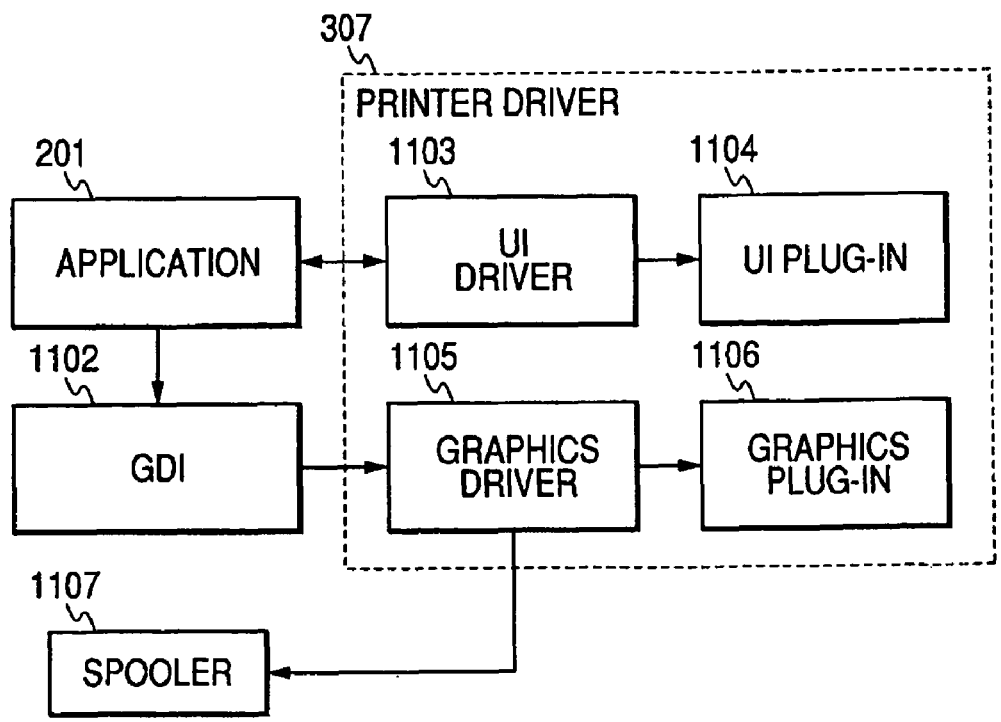
FIG. 3 is a block diagram showing an example of an expansion system of a printer driver of a host computer shown in FIG. 1.

FIG. 3 is a block diagram showing an example of an expansion system of a printer driver of the host computer 3000 shown in FIG. 1. This diagram shows a construction regarding a UI in the case where a plug-in module has been added to a printer driver 307. An expansion system of the printer driver 307 in the embodiment will now be described hereinbelow.

In FIG. 3, the plug-in module is constructed by a UI plug-in 1104 having an expanding function of a UI driver 1103; and a graphics plug-in 1106 having an expanding function of a graphics driver 1105. Each plug-in module will be described hereinbelow.

The UI plug-in 1104 is used in the case where a new sheet is added to a print setting sheet (UI) which is provided to the user by the printer driver 307 or the case of customizing various event processes installed in the UI driver 1103 such as a process upon installation which is being executed by the UI driver 1103.

When a DDI (Device Driver Interface) exported to the system is called, the UI driver 1103 obtains an interface opened by the UI plug-in 1104. A customizing process installed in the UI driver 1103 is executed by communicating with the UI plug-in 1104 by using the interface of the UI plug-in 1104 obtained by the UI driver 1103.

The graphics plug-in 1106 is used in the case where the process of the DDI as an interface between a GDI (Graphics Device Interface) 1102 and the graphics driver 1105 is usurped or the process is added at specific timing or in the case where the spooling process of the print data is usurped. Although the DDI exported by the graphics driver 1105 is properly called from the GDI 1102 in order to form a job, at its initializing timing, the graphics driver 1105 obtains the interface opened by the graphics plug-in 1106 and holds it into the RAM 2. By using the obtained interface, the process of the graphics plug-in 1106 corresponding to the DDI is called at the timing when the DDI is called. The called graphics plug-in 1106 executes the process installed in the plug-in and returns the process to the graphics driver 1105 again.

When the graphics plug-in 1106 usurps the process, the DDI finishes the process here. If the additional process has been installed, the subsequent process is continued.

When the graphics plug-in 1106 usurps the spooling process of the print data of the graphics driver 1105, the interface of the graphics plug-in 1106 is called just before the print data in the graphics driver 1105 is spooled. The called graphics plug-in 1106 obtains the data to be spooled, executes a specific process, and thereafter, calls a spool processing function of the graphics driver 1105 again, thereby sending the data subjected to the specific process to the graphics driver 1105.

The graphics driver 1105 which received the data executes the process for actually spooling the data into a system spooler 1107. By installing the expanding function into the plug-in module as mentioned above, the expansion system of the printer driver 307 is realized.

The memory map in the state where the print processing related program (printer driver) has been loaded into the RAM 2 in the host computer 3000 and can be executed will now be described. FIG. 2 is a diagram showing an example of the memory map in the state where the print processing related program (printer driver) has been loaded into the RAM 2 in the host computer 3000 and can be executed. As shown in FIG. 2, the memory map constructed by the application 201, empty memory 202, related data 203, print processing related program (hereinbelow, referred to as a printer driver) 204, OS 205, and BIOS 206 is formed in the RAM 2.

Figure 4:
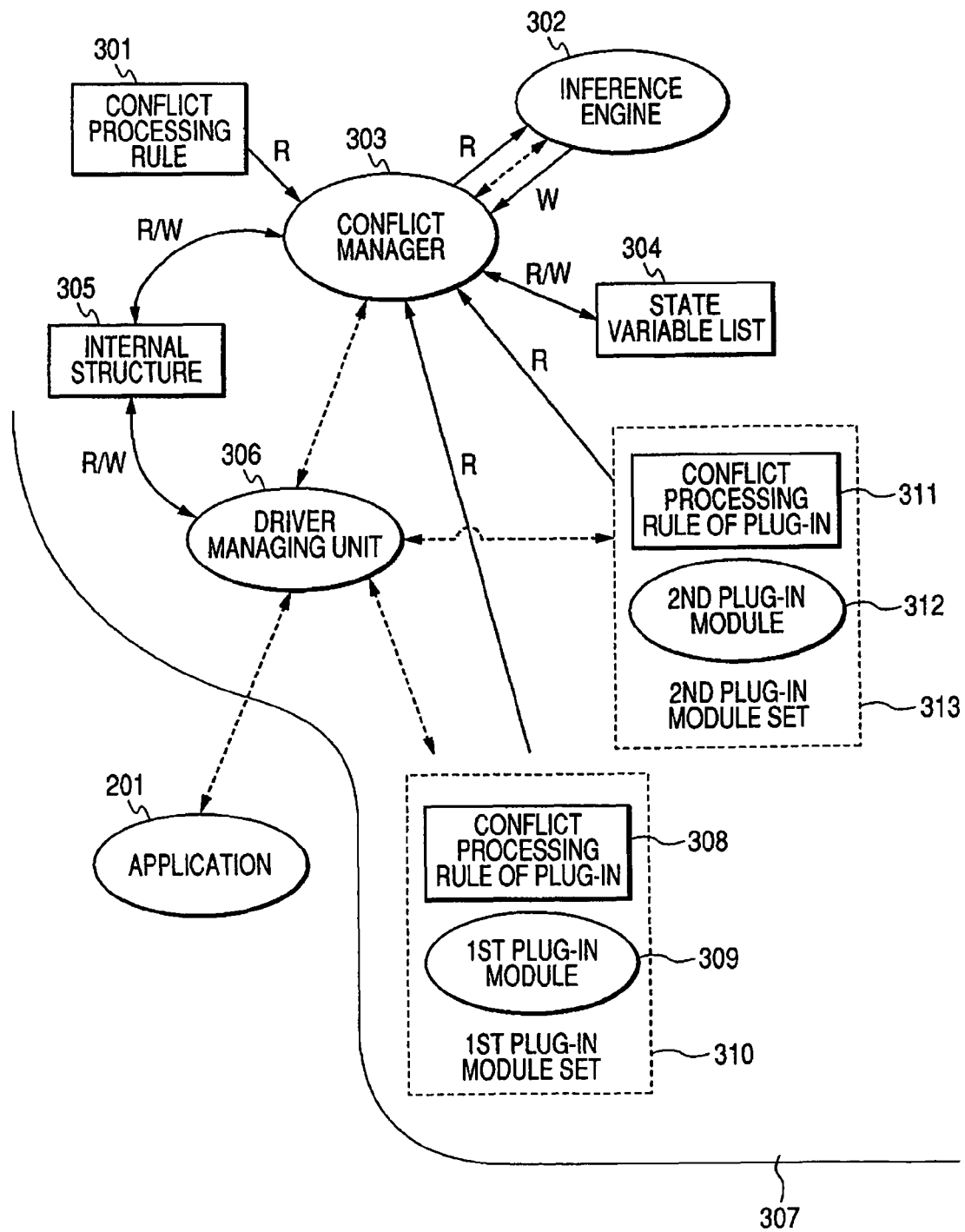
FIG. 4 is a conceptual block diagram showing an example of print processes of various modules of the host computer shown in FIG. 1.

FIG. 4 is a conceptual block diagram showing an example of print processes of various modules of the host computer 3000 shown in FIG. 1. This diagram shows the example of a construction among the modules in the state where a first plug-in module set 310 and a second plug-in module set 313 as a plurality of additional functions have been installed in the printer driver 307.

As shown in FIG. 4, a first plug-in module 309 and a conflict processing rule 308 that is unique to the first plug-in module 309 have been packaged in the first plug-in module set 310. Similarly, a second plug-in module 312 and a conflict processing rule 311 that is unique to the second plug-in module 312 have been packaged in the second plug-in module set 313.

The printer driver 307 before the plug-in was constructed by: a conflict processing rule 301; an inference engine 302; a conflict manager 303; a state variable list 304; an internal structure 305; and a driver managing unit 306. By installing the first plug-in module 309 and the second plug-in module 312, the printer driver 307 in the embodiment newly has a stamp print function and a booklet print function. However, the functions which are added by the plug-in modules are not limited to them.

As anther embodiment, the first plug-in module 309 may be a document management plug-in which stores a document to an external computer (not shown). And the second plug-in module 312 may be a tint block printing plug-in with which tint block printing is executed.

Generally, the copying machine has critical points in reproducing capability that depend on the input resolution for reading fine dots of a manuscript and the output resolution for reproducing fine dots. In the case where the dot in the background section of the tint block image is formed with a size smaller than the critical point of dots that the copying machine can reproduce and the dot masses in the latent image section thereof are formed with a size larger than the critical point, an image composed of larger dot masses of the tint block image is reproduced and an image composed of smaller dots is not reproduced, in the duplicate by copying. As a result, the latent image will be made visible. Moreover, even in the case where dispersed small dots are not completely disappeared by copying, i.e., in the case where the density of the background section is low compared to that of concentrated dot masses, the latent image can be recognized more markedly. For example, a mark "copy inhibited" is embedded into print data as a copy-forgery-inhibited pattern.

When the tint-block printing mode is set in the tint block printing plug-in, it is not secure to allow users to set a store printing mode to the document management plug-in. For security reason, IT manager may implements a rule for the second plug-in module 312 and/or a rule for the first plug-in module 309. When the tint-time block printing mode is set in the tint block printing plug-in, the conflict manager 303 may control prohibition (S307-27) of setting of the store printing mode in the document management plug-in in accordance with the rules obtained from the tint block printing plug-in and/or the document management plug-in.

The conflict processing rule 301 defines the rule to prevent the conflict between the settings in the printer driver 307 before executing the plug-in. A specific example of the conflict processing rule will be described hereinafter. The conflict manager 303 manages so that the data in the state variable list 304 and that in the internal structure 305 coincide. The state variable list 304 includes state variables (for example, Group, Staple, Collate) corresponding to the setting items (for example, group, staple, collate) which can be set by the printer driver 307 and their values (ON/OFF of the setting items). The data in the internal structure 305 includes members (for example, cGroup, cStaple, cCollate) as variables corresponding to the setting items (for example, group, staple, collate) which can be set by the printer driver 307 and their values (ON=1, OFF=0).

The inference engine 302 reads out the conflict processing rule 301, the conflict processing rule 308 of the first plug-in, and the conflict processing rule 311 of the second plug-in through the conflict manager 303, makes a conflict check (inspection about the setting according to the rule) and returns a check result to the conflict manager 303. The driver managing unit 306 controls the display of the UI for executing the initializing process and print setting and controls the operation in the printer driver 307 in accordance with a print setting request or the like from the application 201. The driver managing unit 306 requests the conflict manager 303 so as not to cause the conflict between the setting values. The driver managing unit 306 also transmits and receives the data to/from the first plug-in module 309 and the second plug-in module 312.

A method whereby the conflict manager 303 and the inference engine 302 shown in FIG. 4 execute the conflict process by using the state variable list 304, internal structure 305, and conflict processing rule 301 will now be described with respect to a simple specific example.

Figure 5:
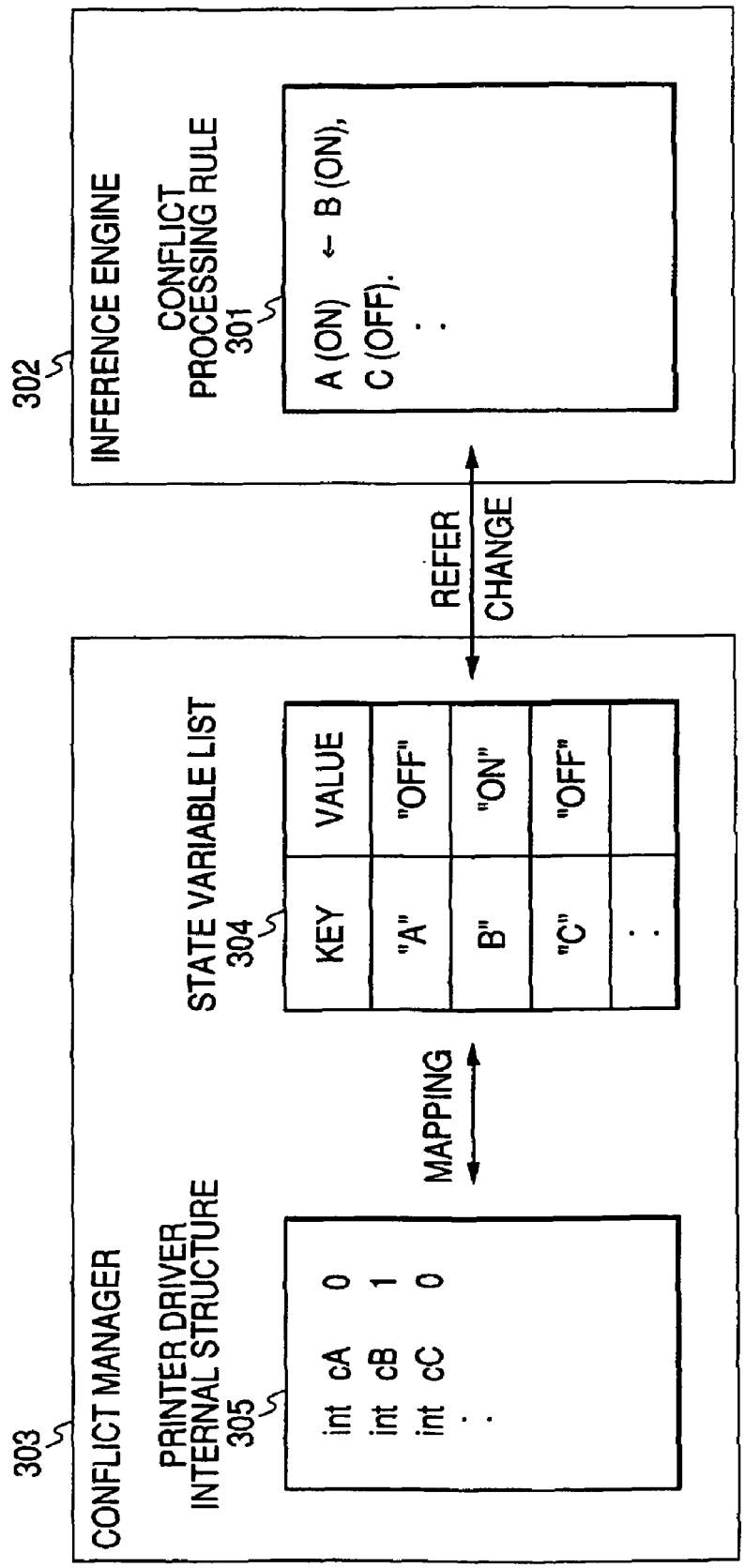
FIG. 5 is a diagram showing an example of a conflict process in a conflict manager and an inference engine shown in FIG. 4.

FIG. 5 is a diagram showing an example of the conflict process in the conflict manager 303 and the inference engine 302 shown in FIG. 4. In FIG. 5, in order to show that the conflict manager 303 uses the state variable list 304 and the internal structure 305 and the inference engine 302 uses the conflict processing rule 301, the state variable list 304 and the internal structure 305 are shown in a frame of the conflict manager 303 and the conflict processing rule 301 is shown in a frame of the inference engine 302.

In the specific example shown in FIG. 5, the example of the conflict process according to the settings of printer function names A, B, C, . . . is shown. As shown in FIG. 5, the members int cA, int cB, int cC, . . . corresponding to the printer function names A, B, C, . . . and their values "0", "1", "0", . . . have been stored in the internal structure 305. By referring to the members in the internal structure 305 and their values, the conflict manager 303 forms the state variable list 304 in which a state variable A=OFF, a state variable B=ON, a state variable C=OFF, . . . . Since the inference engine 302 referred to the state variable list 304, initial values of the state values of the printer function names A, B, C, . . . in the inference engine 302 are equal to "OFF", "ON", "OFF", . . . .

It is assumed that the following rule has been defined in the conflict processing rule 301.

$$A(ON) \leftarrow B(ON), C(OFF)$$

This means that a rule in which when the function B is ON and the function C is OFF, the function A is turned on is defined.

The inference engine 302 reads put the conflict processing rule 301 through the conflict manager 303. It is now assumed that the inference of the conflict check has been made in the inference engine 302. Since the initial values are assumed to be "printer function name B=ON" and "printer function name C=OFF", the rule "A(ON)←B(ON), C(OFF)" defined by the conflict processing rule 301 is satisfied. Therefore, the inference engine 302 changes the state variable value of the printer function name A of the left side to "ON". That is, the inference engine 302 updates the contents to "state variable A=ON" in the state variable list 304.

After the inference of the conflict check is finished in the inference engine 302, the conflict manager 303 reflects the changed value of the state variable A to the corresponding member int cA of the internal structure 305 of the printer driver 307.

That is, the value of int cA is changed from "0" to "1" since the above rule is satisfied.

By the processes as mentioned above, the conflict manager 303 and the inference engine 302 update the state variable list 304 so that no conflict occurs between the settings. The driver managing unit 306 reflects it to the setting information (members cA, cB, ...) in the internal structure 305 which is used for the UI.

The foregoing rule defined by the conflict processing rule 301 mentioned above is used to show the simple specific example and the conflict processing rule 301 in the embodiment defines, for example, the following rule examples (1) to (3).

Collate(OFF)←Group(ON)    (1)

Collate(OFF)←Staple(ON)    (2)

Collate(ON)←Group(OFF)    (3)

The conflict processing rule 308 of the first plug-in defines, for example, the following rule example (4).

Poster (OFF)←Stamp(ON)    (4)

Further, the conflict processing rule 311 of the second plug-in defines, for example, the following rule example (5).

Group(OFF)←Booklet(ON)    (5)

where,
Collate: sorting function
Group: grouping function
Staple: stapling function
Stamp: stamp print function
Booklet: booklet print function Processes regarding the UI of the printer, driver 307 in the host computer 3000 of the embodiment will now be described.

When the initializing process provided for the printer driver 307 is called by the application 201 which operates under the management of the OS 205, the printer driver 307 is loaded into the RAM 2 under the management of the OS 205. When the printer driver 307 is loaded into the RAM 2, the initialization processing unit of the printer driver 307 equipped for the driver managing unit 306 is called and the initializing process is executed.

Figure 6:
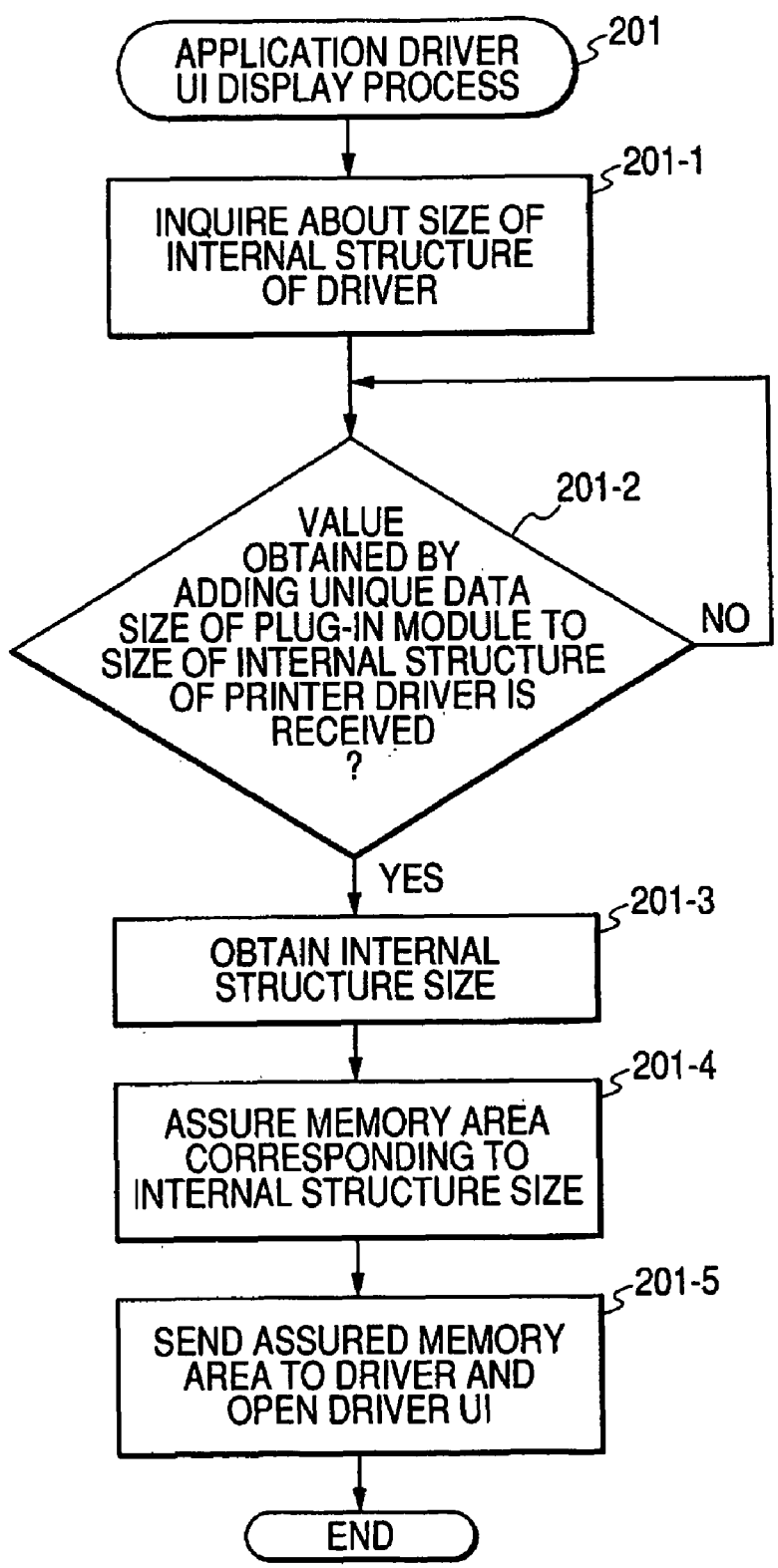
FIG. 6 is a flowchart showing an example of a first data processing procedure in the data processing apparatus according to the invention.
Figures 7, 7A, 7B:
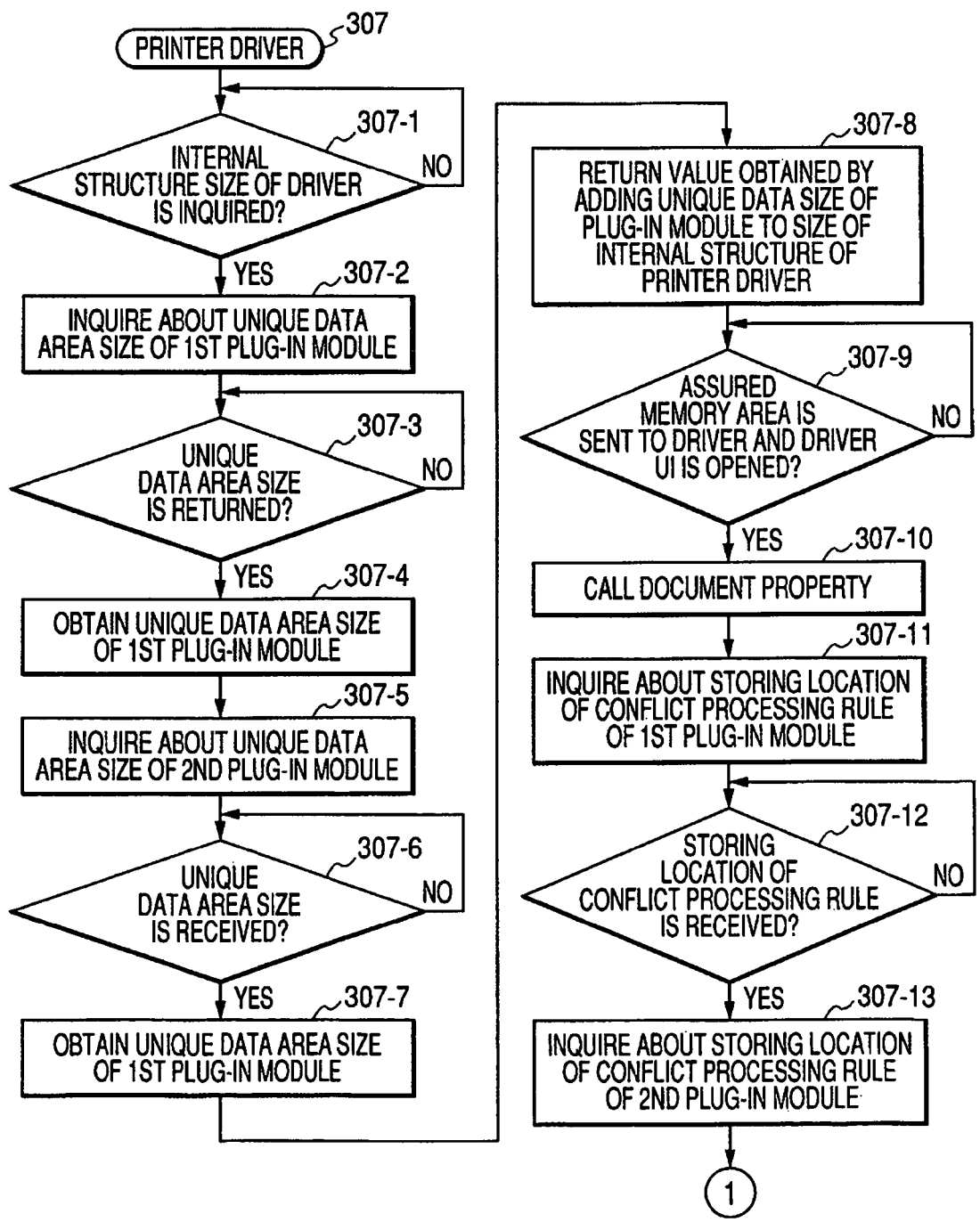
FIG. 7 is comprised of FIGS. 7A and 7B showing flowchart of an example of the first data processing procedure in the data processing apparatus according to the invention.
Figure 7B:
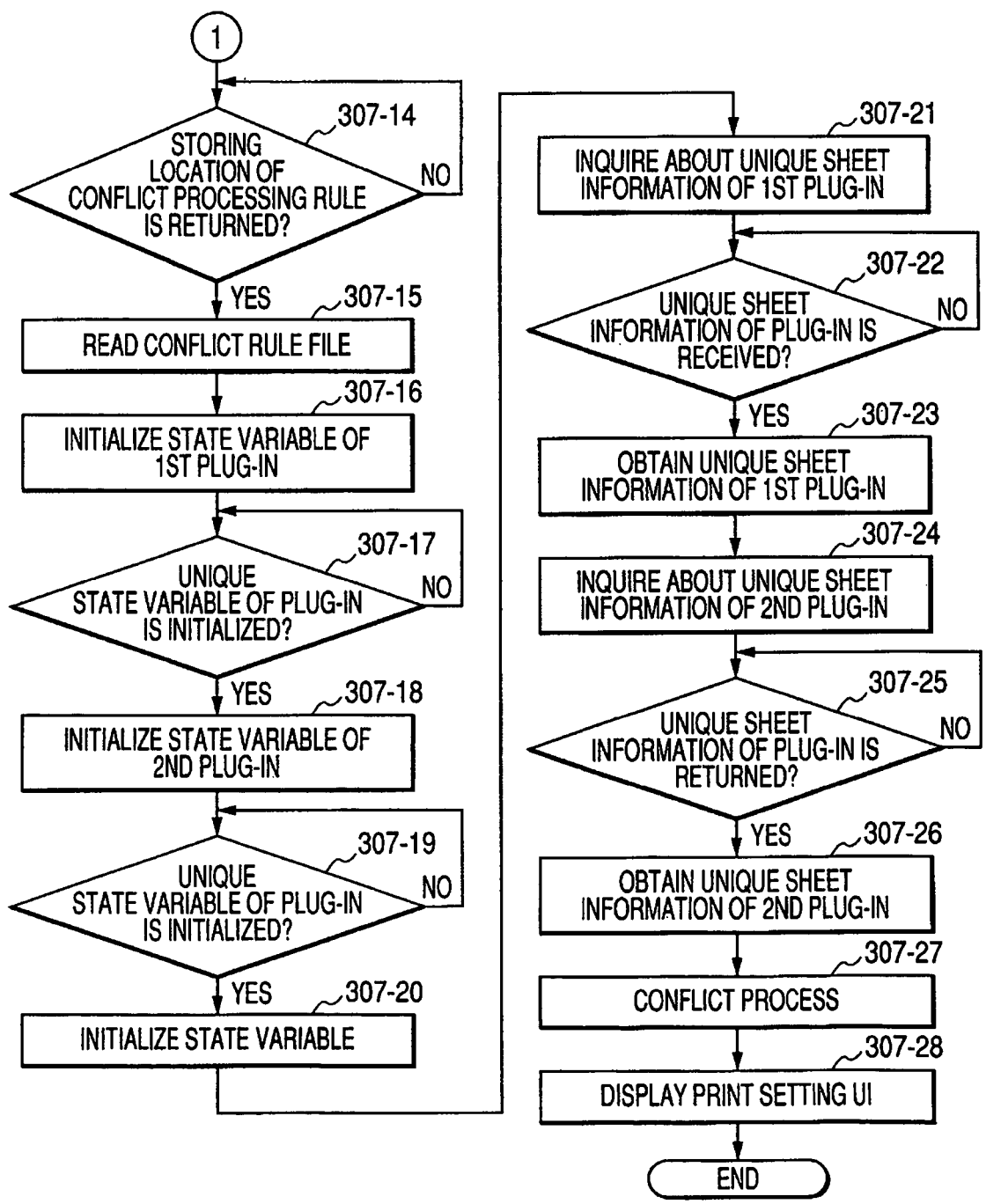
Figure 8A:
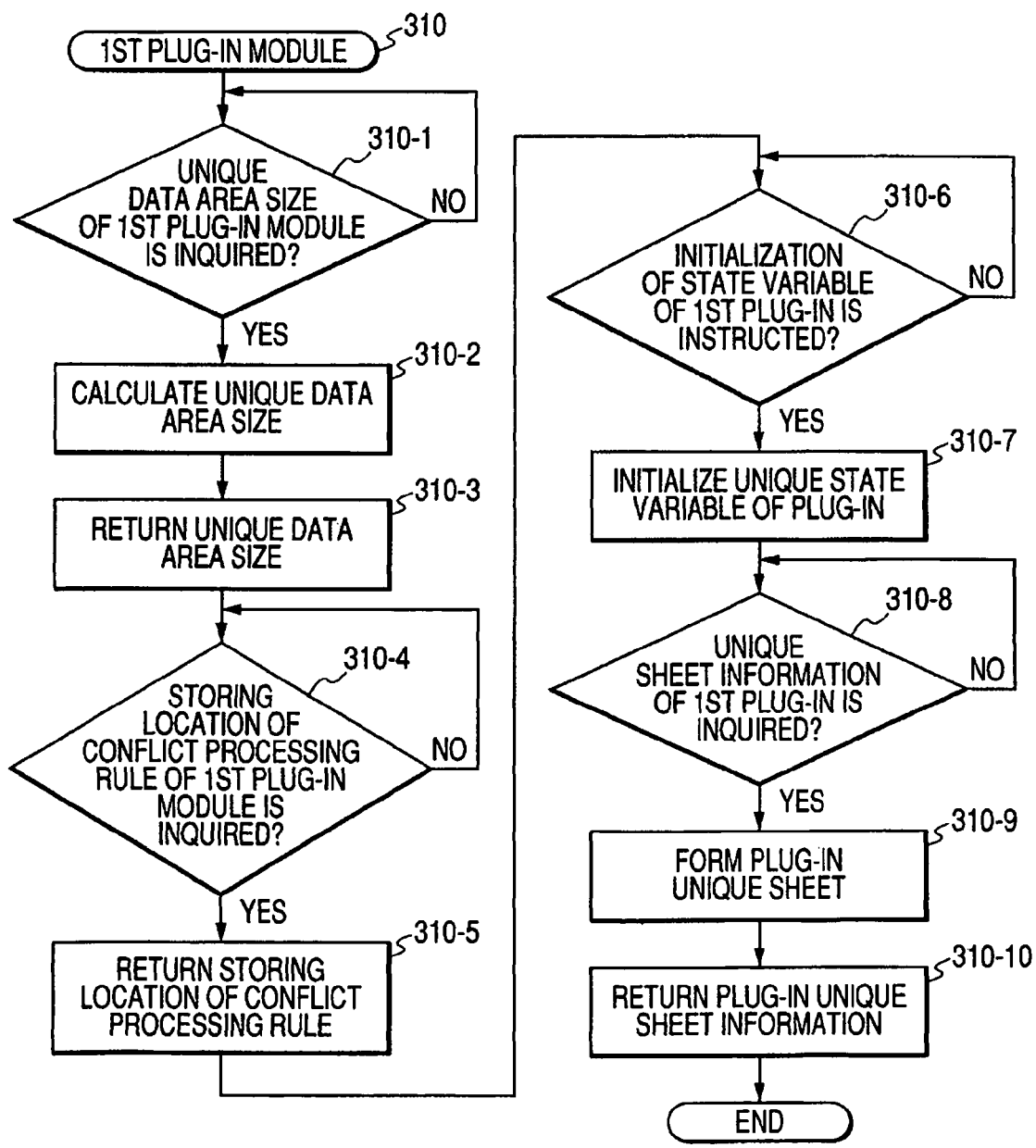
FIGS. 8A and 8B are flowcharts showing an example of the first data processing procedure in the data processing apparatus according to the invention.
Figure 8B:
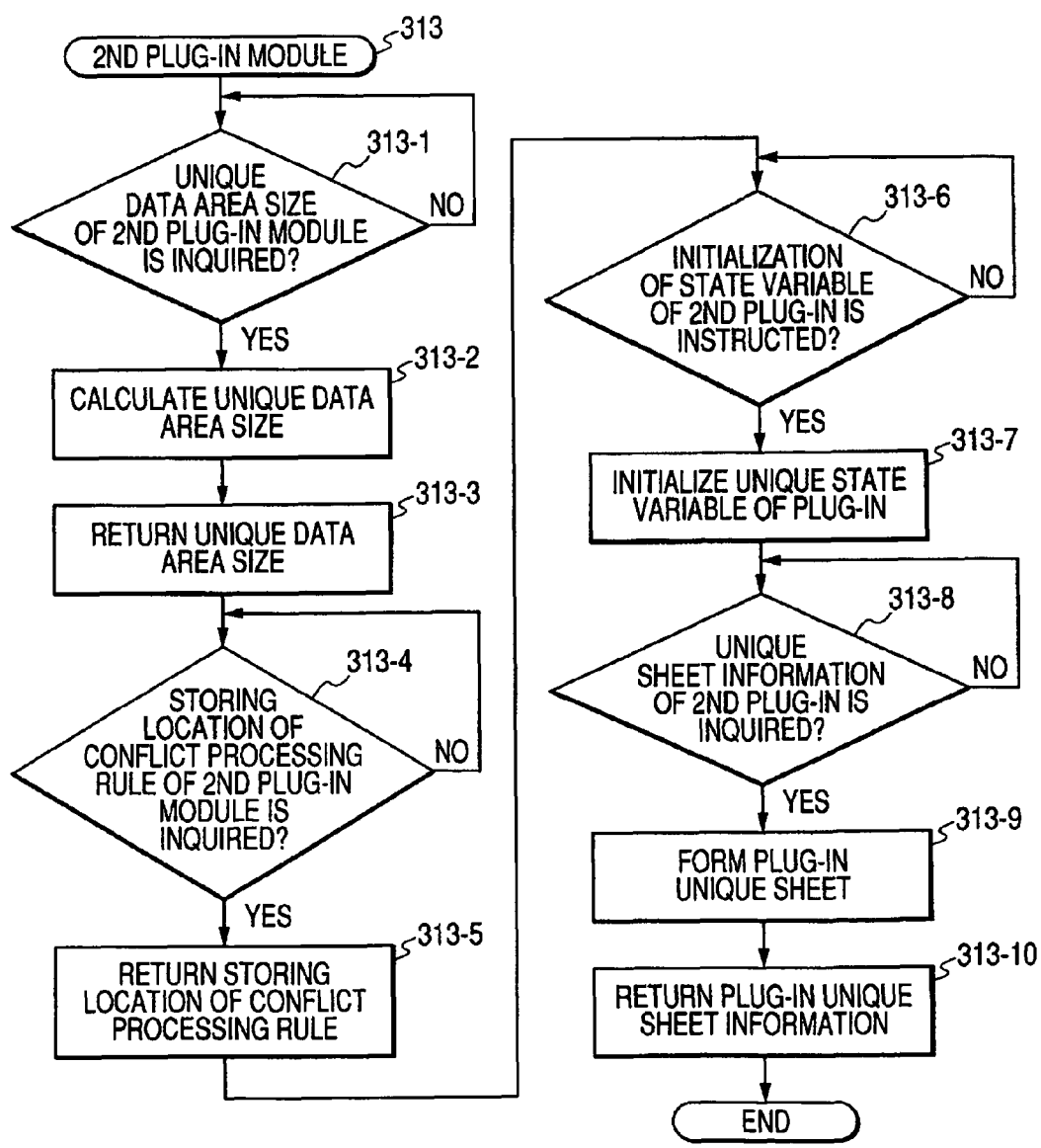

FIGS. 6, 7A, 7B, 8A and 8B are flowcharts showing an example of the first data processing procedure in the data processing apparatus according to the invention and correspond to the procedure for executing the initializing process when the UI of the printer driver 307 is opened by the application 201 shown in FIG. 4. In FIG. 6, (201-1) to (201-5) correspond to processing steps which are executed by the application 201. In FIGS. 7A and 7B, (307-1) to (307-28) correspond to processing steps which are executed by the driver managing unit 306 shown in FIG. 4. In FIG. 8A, (310-1) to (310-10) correspond to processing steps which are executed by the first plug-in module set 310. In FIG. 8B, (313-1) to (313-10) correspond to processing steps which are executed by the second plug-in module set 313.

As shown in FIG. 4, the first plug-in module 309 is a module which has been installed into the printer driver 307 by the plug-in.

First, the application 201 inquires of the printer driver 307 about a size of memory area to store the internal structure of the printer driver 307 (201-1).

When the printer driver 307 receives the inquiry in step 201-1 (307-1), it inquires of the first plug-in module 309 about a size of data area of the internal structure which is necessary for the first plug-in module 309 (307-2).

When the first plug-in module 309 receives the inquiry about the size of data area (310-1), it calculates the area size of the internal structure which is necessary (310-2) and returns the calculated area size to the printer driver 307 (310-3).

After that, when the calculated area size is received from the first plug-in module 309 (310-3), the printer driver 307 obtains the size of internal structure which is necessary for the first plug-in module 309 (307-4).

In the embodiment, since the state where the two plug-in modules (the first plug-in module 309 and the second plug-in module 312) have been installed is presumed, the printer driver 307 subsequently inquires of the second plug-in module 312 about the size of data area of the internal structure 305 which is necessary for the second plug-in module 312 (310-5).

When the second plug-in module 312 receives the inquiry about the size of data area (313-1), it calculates the area size of the internal structure 305 which is necessary (313-1) and returns the calculated area size to the printer driver 307 (313-3).

When the printer driver 307 receives the size of internal structure which is necessary for the a second plug-in module 312 (307-6), it obtains the size of internal structure which is necessary for the second plug-in module 312 (307-7). After that, the data size obtained by adding the sum of the sizes of the two plug-in modules obtained in steps 307-4 and 307-6 to the size of internal structure which is necessary is returned to the application 201 (307-8).

The application 201 receives the value returned from the printer driver 307 (201-2), obtains the value returned from the printer driver 307 (201-3), and assures the memory area of the obtained size into the memory 202 (201-4).

Subsequently, the memory area assured in step 201-4 is sent to the printer driver 307, an instruction is issued to the printer driver 307 to open the UI of the printer driver 307 (201-5), and the processing routine is finished.

Figure 9:
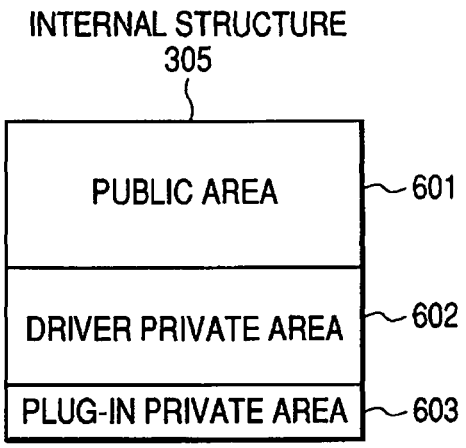
FIG. 9 is a diagram showing an example of a construction of a memory map of an internal structure which is needed by a printer driver shown in FIG. 4.

The internal structure 305 in this instance has a memory map construction, for example, as shown in FIG. 9.

FIG. 9 is a diagram showing an example of the construction of the memory map in the internal structure 305 which is needed by the printer driver 307 shown in FIG. 4.

As shown in FIG. 9, the internal structure 305 is constructed by a public area 601; a driver private area 602 according to the data area size necessary for the printer driver 307; and a plug-in private area 603 according to the unique data area sizes of the first plug-in module 309 and the second plug-in module 312.

Subsequently, when the instruction to open the UI of the printer driver 307 is received (307-9), an interface (Document Property) of the printer driver 307 is called on the basis of the received instruction (307-10).

The printer driver 307 inquires of the first plug-in module set 310 about a storing location of the first conflict processing rule 308 packaged with the first plug-in module 309 (307-11).

When the first plug-in module 309 receives the inquiry about the storing location of the packaged first conflict process rule 308 (310-4), a storing location of a file in which the first conflict processing rule 308 regarding the setting values of the first plug-in module 309 has been described is returned to the printer driver 307 (310-5).

Subsequently, when the storing location is received from the first plug-in module 309 (307-12), the printer driver 307 inquires of the second plug-in module 312 about a storing location of the packaged second conflict processing rule 311 (307-13).

When the second plug-in module 312 receives the inquiry about the storing location of the packaged second conflict processing rule 311 (313-4), the second plug-in module 312 returns a storing location of a file in which the second conflict processing rule 311 regarding the setting values of the second plug-in module 312 has been described to the printer driver 307 (313-5).

When the printer driver 307 receives the storing location of the file in which the second conflict processing rule 311 has been described (307-14), the inference engine 302 reads out the conflict processing rule 308 packaged with the first plug-in module 309 and the conflict processing rule 311 packaged with the second plug-in module 312 and stores them into the RAM 2 through the conflict manager 303 and, thereafter, reads out the conflict processing rule 301 (307-15).

As described in FIG. 4, with respect to all of the printer function names defined in the conflict processing rules 301, 308, and 311, the state variables corresponding to the printer function names and their values are held as a state variable list 304 as shown in FIG. 5.

As also shown in FIG. 4, the values of the state variables in the state variable list 304 are linked with the values of the corresponding members of the internal structure 305 which is used by the printer driver 307. The initial values of all of the state variables in the state variable list 304 are equal to the values of the members of the internal structure 305.

The printer driver 307 executes an initializing process of the state variable of the first plug-in through the conflict manager 303 (307-16).

First, when the printer driver 307 instructs the initialization of the state variable of the first plug-in module 309, the first plug-in module 309 receives the instruction (310-6) and initializes the state variable that is unique to the first plug-in module (310-7). After that, the first plug-in module 309 returns the initialized state variable to the printer driver 307.

When the initialized state variable is received from the first plug-in module 309 (307-17), the printer driver 307 adds it to the state variable list 304 through the conflict manager 303.

Similarly, when the printer driver 307 instructs the initialization of the state variable of the second plug-in module 312 (307-18), the second plug-in module 312 receives the instruction (313-6) and initializes the state variable that is unique to the second plug-in module and, thereafter, returns the initialized state variable to the printer driver 307 (313-7).

When the printer driver 307 receives the state variable initialized by the second plug-in module 312 (307-19), the printer driver 307 adds it to the state variable list 304 through the conflict manager 303.

Figure 10A:
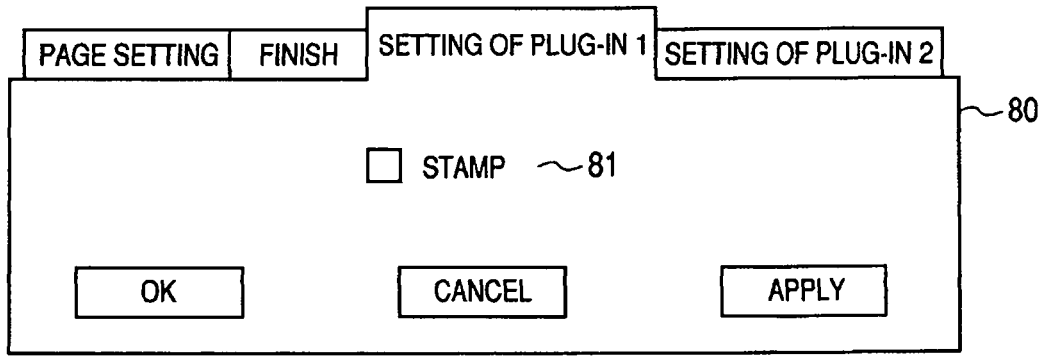
FIGS. 10A and 10B are diagrams showing an example of print setting sheets in the data processing apparatus according to the invention.
Figure 10B:
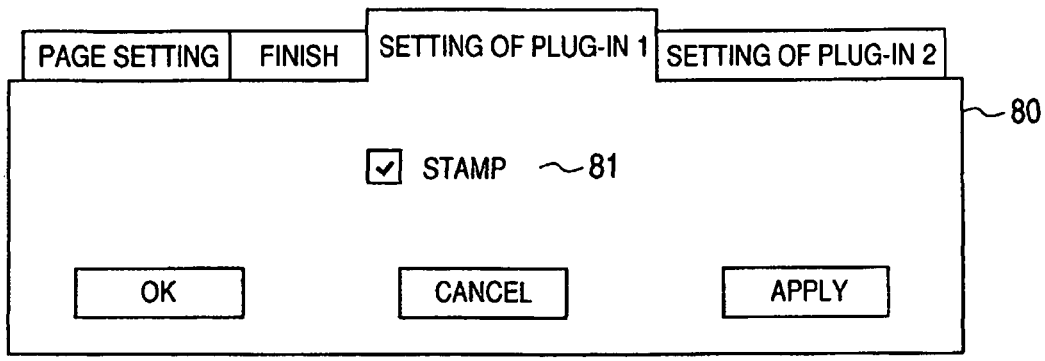

After that, the printer driver 307 initializes its own state variable (307-20) and subsequently inquires of the first plug-in module 309 about information of the setting sheet which is unique to the first plug-in in order to display a setting sheet as a UI which is unique to the first plug-in module 309 as shown in FIGS. 10A and 10B (307-21). When the first plug-in module 309 receives the inquiry about the information of the first plug-in unique setting sheet (310-8), the first plug-in module 309 forms the unique setting sheet (310-9) and returns the information of the formed first plug-in unique setting sheet to the printer driver 307 (310-10). The processing routine is finished.

When the information of the formed first plug-in unique setting sheet is received from the first plug-in module 309 (307-22), the printer driver 307 obtains the setting sheet information which is unique to the first plug-in module 309 (307-23).

Figure 11A:
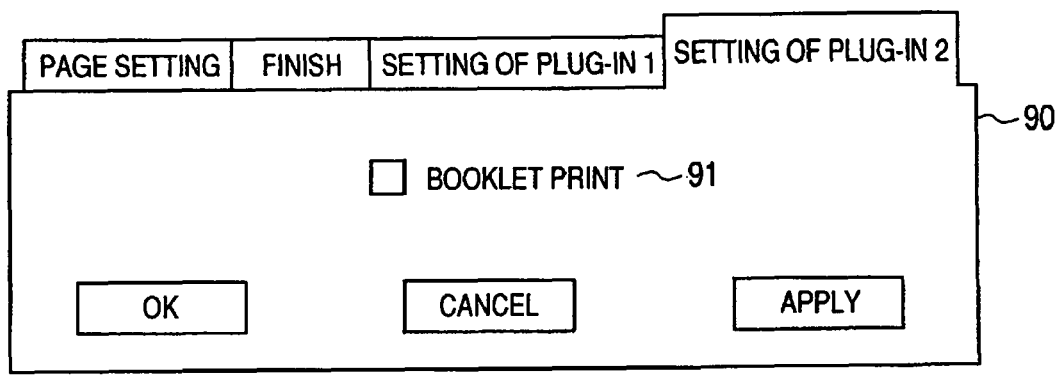
FIGS. 11A and 11B are diagrams showing an example of print setting sheets in the data processing apparatus according to the invention.
Figure 11B:
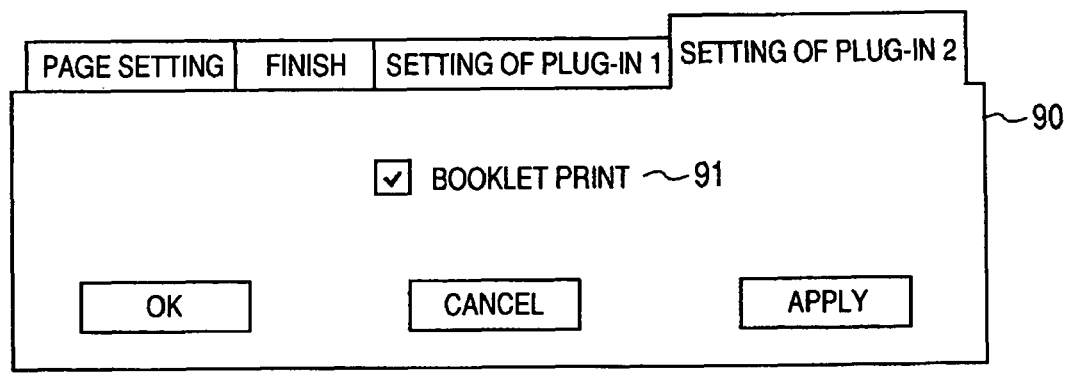

Similarly, the printer driver 307 inquires of the second plug-in module 312 about information of a setting sheet which is unique to the second plug-in in order to display the setting sheet as a UI which is unique to the second plug-in module 312 as shown in FIGS. 11A and 11B (307-24).

When the second plug-in module 312 receives the inquiry about the information of the second plug-in unique setting sheet (313-8), the second plug-in module 312 forms the unique setting sheet (313-9) and returns the information of the formed second plug-in unique setting sheet to the printer driver 307 (313-10). The processing routine is finished.

When the information of the formed unique setting sheet is received from the second plug-in module 312 (307-25), the printer driver 307 obtains the setting sheet information which is unique to the second plug-in module 312 (307-26).

Subsequently, the conflict processes such as conflict check by the inference engine 302, updating of the state variable list 304, updating of the internal structure 305 by the conflict manager 303, and the like are executed in the printer driver 307. If there is a conflict between the settings, it is corrected (307-27).

Subsequently, together with the setting sheet of the printer driver 307, the setting sheets of the first plug-in module 309 and the second plug-in module 312 obtained in steps 307-23 and 307-26 are added and the UI as shown in FIG. 10A is displayed (307-27). The processing routine is finished.

Consequently, when a plurality of plug-in modules are added to the printer driver 307 and the state of the system is changed, by automatically making the plug-in unique print setting without causing conflict between the plug-in unique print setting and the setting of the printer driver main body, in the case of constructing the system in which the additional function is added as a plug-in, an adjustment burden of the setting values that is caused before and after the system change is remarkably reduced and ease of use of the user is improved.

In the embodiment, when the OS 205 is, for example, "WINDOWS (registered trademark)", it is assumed that a DEVMODE structure is formed as an internal structure, which will be explained hereinafter, and the flowcharts shown in FIGS. 6, 7A, 7B, 8A and 8B or flowcharts shown in FIGS. 12, 13A, and 13B, which will be explained hereinafter, are executed at the timing when the application 201 forms the DEVMODE structure.

Further, it is also possible to construct in such a manner that by storing a history of the setting change to the UI display screen into the NVRAM or the like, the operator or service person can confirm the fact that the UI control has been change by installation or the like of the plug-in.

FIGS. 10A, 10B, 11A, and 11B are diagrams showing examples of print setting sheets in the data processing apparatus according to the invention. These diagrams show the examples of the print setting sheets as UIs which are provided to the user by the printer driver 307 after the plug-in by the processes shown in FIG. 6 and the like.

As shown in FIG. 10A, a setting sheet 80 of the first plug-in module 309 and the second plug-in module 312 such as "setting of the plug-in 1" and "setting of the plug-in 2" and a setting sheet 90 shown in FIGS. 11A and 12B are added to the inherent setting sheets (page setting, finishing) of the printer driver 307.

The setting sheets 80 and 90 have check boxes 81 and 91 which are used for the user to set ON/OFF of the stamp print function and ON/OFF of the booklet print function.

In the setting sheet 80 of FIG. 10A, since the check box 81 is not marked, the apparatus is in the state where the stamp print function is OFF (the state where the state variable is the initial value). In the setting sheet 90 of FIG. 11A, since the check box 91 is not marked, the apparatus is in the state where the booklet print function is OFF (the state where the state variable is the initial value).

In the setting sheet 80 of FIG. 10A, when the user marks the check box 81 as shown in FIG. 10B, the stamp print function is turned on. In the setting sheet 90 of FIG. 11A, when the user marks the check box 91 as shown in FIG. 11B, the booklet print function is turned on.

The conflict process in the case where after the stamp print function as a function of the first plug-in is turned on as shown in FIG. 10B, the booklet print function as a function of the second plug-in is turned on as shown in FIG. 11B will now be explained.

Figure 12:
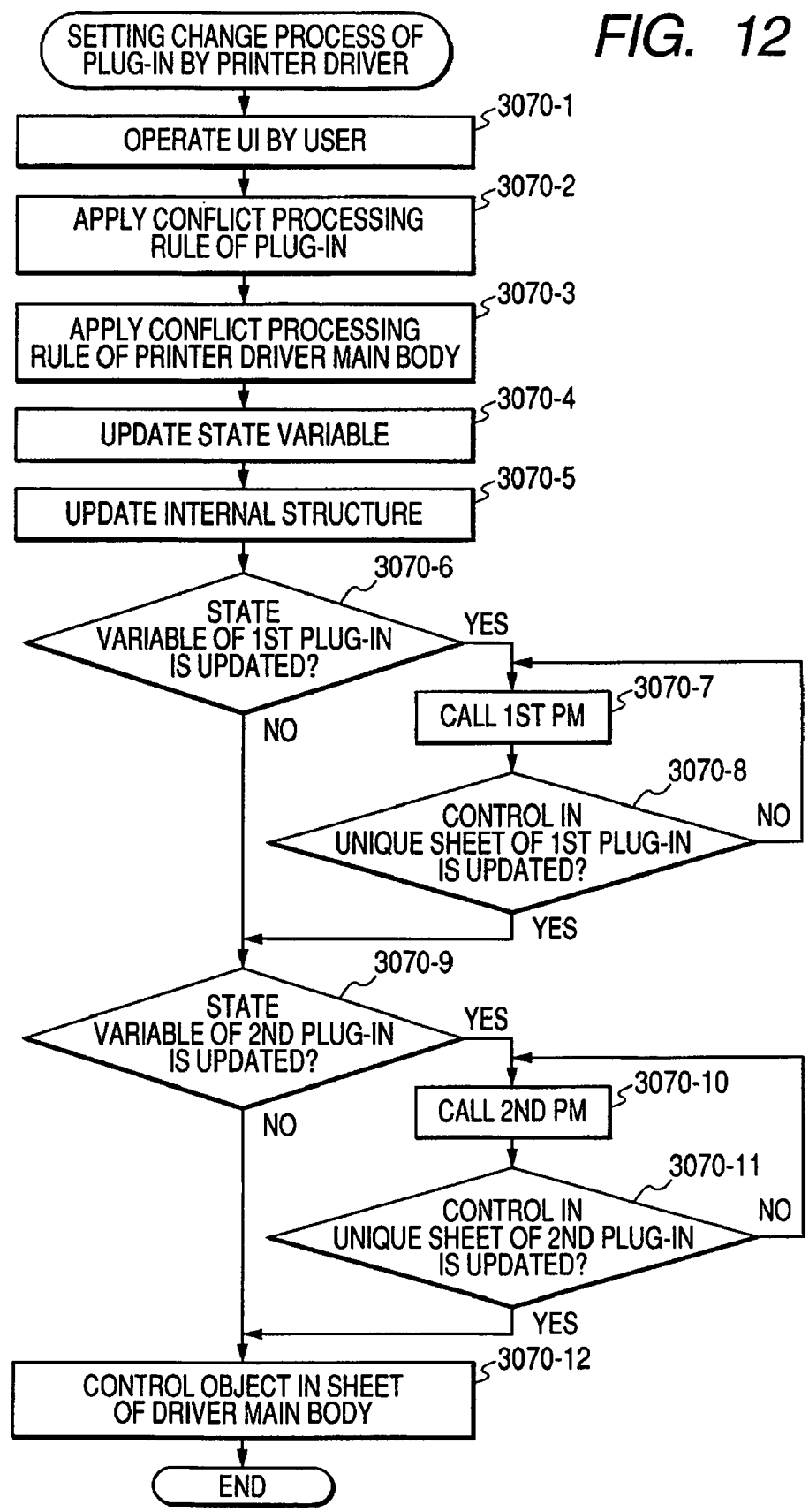
FIG. 12 is a flowchart showing an example of the second data processing procedure in the data processing apparatus according to the invention.
Figure 13A:
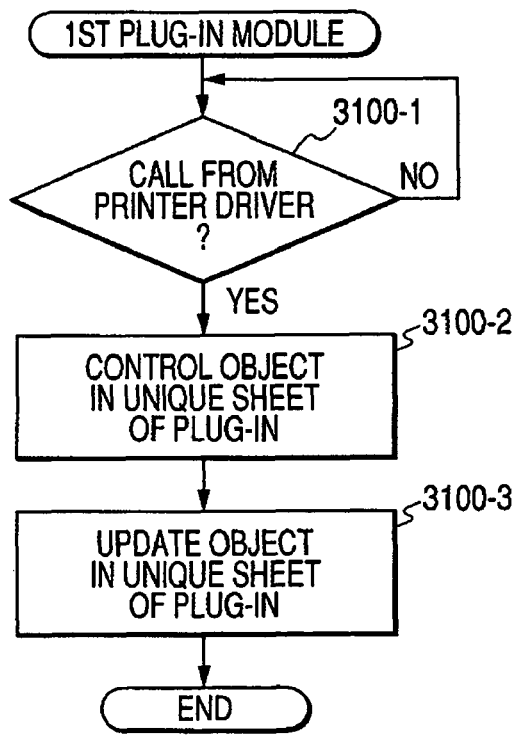
FIGS. 13A and 13B are flowcharts showing an example of the second data processing procedure in the data processing apparatus according to the invention.
Figure 13B:
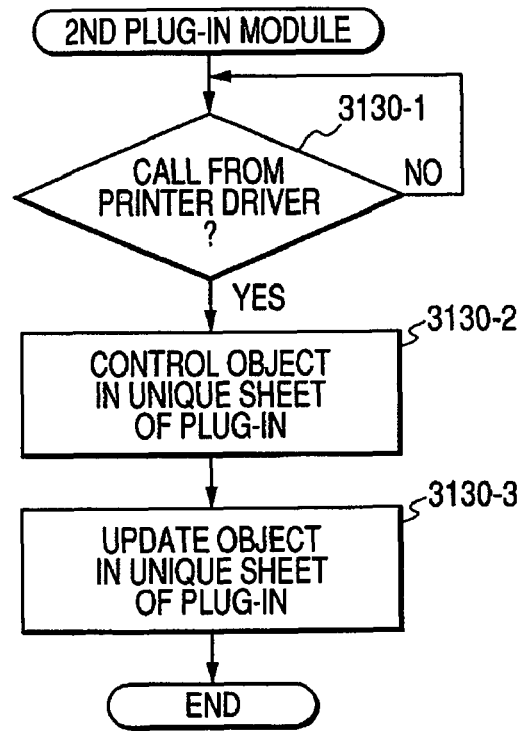

FIGS. 12, 13A, and 13B are the flowcharts showing an example of the second data processing procedure, in the data processing apparatus according to the invention and correspond to the conflict processing procedure in the case where the stamp print function and the booklet print function as functions of the first plug-in and the second plug-in as shown in FIGS. 10B and 11B are changed to ON. In FIG. 12, (3070-1) to (3070-12) correspond to processing steps which are executed by the driver managing unit 306 shown in FIG. 4. In FIG. 13A, (3100-1) to (3100-3) correspond to processing steps which are executed by the first plug-in module set 310. In FIG. 13B, (3130-1) to (3130-3) correspond to processing steps which are executed by the second plug-in module set 313.

First, for example, from the UI display screen state shown in FIG. 10A displayed on the CRT 10 shown in FIG. 1, the user updates the internal structure 305 and the state variable list 304 in accordance with the marking operation of the check box 81 as shown in the state of the UI display screen of FIG. 10B (3070-1).

In response to the UI operation, the conflict processing rule 308 of the first plug-in module 309 read out in step 307-15 shown in FIGS. 7A and 7B and the conflict processing rule 311 of the second plug-in module 312 read out in step 307-15 shown in FIGS. 7A and 7B are applied (3070-2).

Subsequently, a process for applying the conflict processing rule 301 held by the main body of the printer driver 307 is executed (3070-3). The state variable of the state variable list 304 is updated in accordance with the conflict processes (3070-4). Processes according to the operation in which, from the UI display screen state shown in FIG. 11A, the user marks the check box 91 of the UI display screen as shown in of FIG. 11B are also similarly executed.

In the embodiment, the processing rules of steps 3070-2 and 3070-3 are applied in order of the processing rules which have been read in step 307-15 shown in FIGS. 7A and 7B.

Priorities of the processing rules are also determined in accordance with the applying order of a plurality of processing rules. In the embodiment, the conflict processing rule 308 has the higher priority than the conflict processing rule 301 and the conflict processing rule 311 has the higher priority than the conflict processing rule 308. When the user wants to preferentially apply the conflict processing rule 301, a process to preferentially apply the conflict processing rule 308 or 311 is executed. Although the reading order is not particularly described, it is also possible to construct in such a manner that the priorities of the processing rules are described in the information file or the like and the conflict processing rules are read out in accordance with such information Specific examples of the conflict process will now be described.

For example, it is assumed that, in the internal structure 305 shown in FIG. 4, there are cCollate, cGroup, cPoster, cStaple, cStamp, and cBooklet as members corresponding to the printer functions.

It is assumed that, just before step 3070-1, values of those members before the conflict processing rules are applied are as follows.

cCollate=0
cGroup=1
cPoster=1
cStaple=0
cStamp=0
cBooklet=0

Thus, in the state variable lift 304, the state variables Collate, Group, Poster, Staple, Stamp, and Booklet corresponding to the members and the state values are as follows.

Collate=OFF
Group=ON
Poster=ON
Staple=OFF
Stamp=OFF
Booklet=OFF

At this time, a finishing setting sheet 100 as a UI which is provided by the printer driver 307 is in the state where, as shown in FIG. 14A, a check button 104 of the postering function has been selected, a radio button 101 of the sorting function is not selected, and a radio button 102 of a grouping function has been selected. Since the operation of the user corresponding to FIG. 10B is not executed yet (before step 3070-1), "Stamp" is OFF.

In such a state, in accordance with step 3070-1, the printer driver 307 receives a changing request to change the setting of the stamp print function to ON which is issued from the application 201.

Thus, the member cStamp of the internal structure 305 is updated from "0" to "1" as follows.

cCollate=0
cGroup=1
cPoster=1
cStaple=0
cStamp=0
cBooklet=0

Subsequently, the driver managing unit 306 calls the conflict manager 303 and updates the state variable of "Stamp" in the state variable list from OFF to ON. Thus, the state variable list 304 changes as follows.

Collate=OFF
Group=ON
Poster=ON
Staple=OFF
Stamp=ON
Booklet=OFF

Subsequently, in step 3070-2, the inference engine 302 is called and the application of the conflict processing rule is started. First, the printer function names in the inference engine 302 are initialized by the values held by the state variables in the state variable list 304. Subsequently, the rule example (1) of the conflict processing rule 308 which has already been read out in step 307-15 is applied and the state value of the state variable "Poster" changes from ON to OFF. As mentioned above, the rule example (1) is the rule which is defined by $$\text{Poster(OFF)} \leftarrow \text{Stamp(ON)}$$

Thus, the state values in the state variable list 304 are also updated as follows.

Collate=OFF
Group=ON
Poster=OFF
Staple=OFF
Stamp=ON

Booklet=OFF

Among the conflict processing rules 301, 308, and 311, since there are no other rules to be applied, the application of the conflict processing rules in the inference engine 302 is finished.

As described above, the conflict process is executed by the processes of steps 3070-1 to 3070-3 in accordance with the setting change performed on the UI.

Returning to the flowchart of FIG. 12, after the state variable list 304 is updated in accordance with the conflict processing rules 301, 308, and 311 in step 3070-4, the conflict manager 303 updates the internal structure 305 in accordance with the updated state variable list 304 (3070-5).

Specifically speaking, the values of the members are as follows.
 cCollate=0
 cGroup=1
 cPoster=0
 cStaple=0
 cStamp=1
 cBooklet=0

Subsequently, the printer driver 307 discriminates whether or not the state variable of the first plug-in module 309 has been updated in the process of step 3070-4 (3070-6).

If the printer driver 307 determined that the state variable has been updated (YES in step 3070-6), the printer driver 307 calls the first plug-in module 309 (step 3070-7).

When the first plug-in module 309 is called by the printer driver 307 (3100-1), the object (control) in the unique setting sheet of the plug-in module 309 is controlled (3100-2), the object (control) in the unique setting sheet of the plug-in module 309 is updated (3100-3), and the processing routine is returned to the printer driver 307.

If it is determined in step 3070-6 that the state variable of the first plug-in module 309 is not updated (NO in step 3070-6) or when the printer driver 307 confirms an updating end signal which is returned from the first plug-in module 309 (step 3070-8), the printer driver 307 discriminates whether or not the state variable of the second plug-in has been updated (3070-9).

However, since the state variable of the second plug-in is not updated in this case, the processing routine advances to next step 3070-12. The object in the setting sheet of the printer driver 307 main body is controlled in accordance with the state variable updated in step 3070-4 (3070-12). The processing routine is finished.

If it is determined that the state variable of the second plug-in has been updated in step 3070-9, the second plug-in module 312 is called (3070-10). Processing steps which are executed after the second plug-in module 312 is called will be described hereinafter.

Although the finishing setting sheet 100 before the conflict processing rule is applied was in the UI display screen state shown in FIG. 14A, after the conflict processing rule is applied, it changes to the UI display screen state shown in FIG. 14B by the example of the conflict process according to the setting change shown in steps 3070-1 to 3070-11 and 3100-1 to 3100-3.

That is, although the check button 104 of the postering (the member name of the internal structure is "Poster") function has inherently been selected in the "finishing" setting sheet 100, by applying the conflict processing rule, it is changed to the state where the check button 104 is not selected.

Processes which are executed when the sheet of the booklet function as a second plug-in function is turned ON on the UI display screen will now be described.

At this point of time, the finishing setting sheet 100 as a UI which is provided by the printer driver 307 is in the state where the radio button 101 of the sorting function is not selected and the radio button 102 of the grouping function has been selected as shown in FIG. 14B. Booklet is OFF because the operation of the user as shown in FIG. 8B is not executed yet (before step 3070-1).

In such a state, in accordance with the process of step 3070-1, the printer driver 307 receives a change request for changing the setting of the booklet print function to ON which is sent from the application 201. Thus, the member cBooklet of the internal structure 305 is updated from "0" to "1" as follows.
 cCollate=0
 cGroup=1
 cPoster=0
 cStaple=0
 cStamp=1
 cBooklet=1

Subsequently, the driver managing unit 306 calls the conflict manager 303 and updates the state variable of Booklet in the state variable list from OFF to ON. Thus, the state variable list 304 is updated as follows.
 Collate=OFF
 Group=ON
 Poster=OFF
 Staple=OFF
 Stamp=ON
 Booklet=ON Subsequently, in step 3070-2, the inference engine 302 is called and the application of the conflict processing rule is started. The rule example (2) of the conflict processing rule 311 which has already been read out in step 307-15 shown in FIGS. 7A and 7B are applied and the state value of the state variable "Group" is changed from ON to OFF. As mentioned above, the rule example (2) is the rule defined by.

$$Group(OFF) \leftarrow Booklet(ON)$$

Thus, the state values in the state variable list 304 are also updated as follows.
 Collate=OFF
 Group=OFF
 Poster=OFF
 Staple=OFF
 Stamp=ON
 Booklet=ON Subsequently, in step 3070-3, the rule example (5) in the conflict processing rule 301 is applied and the state value of the state variable "Collate" is changed from OFF to ON. As mentioned above, the rule example (5) is the rule defined by $$Collate(ON) \leftarrow Group(OFF)$$

Among the conflict processing rules 301, 308, and 311, since there are no other rules to be applied, the application of the conflict processing rules in the inference engine 302 is finished.

Thus, the state values in the state variable list 304 are also updated as follows (3070-4).
 Collate=ON
 Group=OFF
 Poster=OFF
 Staple=OFF
 Stamp=ON
 Booklet=ON As shown above, by the processes of steps 3070-1 to 3070-4, the conflict process is executed in accordance with the setting change performed on the UI display screen.

Returning to the flowchart shown in FIG. 12, after the state variable list 304 is updated in accordance with the conflict processing rules 301, 308, and 311 in step 3070-4, the conflict manager 303 updates the internal structure 305 in accordance with the updated state variable list 304 (3070-5). Specifically speaking, the values of the members are as follows.

cCollate=1
cGroup=0
cPoster=0
cStaple=0
cStamp=1
cBooklet=1

Subsequently, the printer driver 307 discriminates whether or not the state variable of the first plug-in module 309 has been updated (3070-6). In this case, since the state variable of the first plug-in module 309 is not updated, the processing routine advances to next step 3070-9.

In step 3070-9, the printer driver 307 discriminates whether or not the state variable of the second plug-in module 312 has been updated. In this instance, if the printer driver 307 determines that the state variable has been updated (YES in 3070-9), the printer driver 307 calls the second plug-in module 312 (3070-10).

When the second plug-in module 312 is called by the printer driver 307 (3130-1), the second plug-in module 312 controls the object in the unique setting sheet of the second plug-in module 312 in accordance with the change in the state variable (3130-2) and updates the object in the unique setting sheet of the second plug-in module 312 (3130-3). The processing routine is returned to the printer driver 307 and finished.

Thus, the printer driver 307 executes a process shown in step 3070-11.

Processes which are executed in the case where the state variable of the second plug-in module 312 is not updated in step 3070-9 (in the case of NO in step 3070-9) are similar to those in the foregoing description of the first plug-in module 309.

In step 3070-11, when the printer driver 307 receives the state variable corresponding to the second plug-in updated in step 3070-9, it controls the object in the setting sheet of the printer driver 307 main body in accordance with the received state variable corresponding to the second plug-in (3070-12). The processing routine is finished.

The printer driver 307 updates the object controlled in the setting sheet of the printer driver 307 main body in step 3070-12 and finishes the conflict process and the UI process.

Although the finishing setting sheet 100 before the conflict processing rule is applied was in the UI display screen state shown in FIG. 14B, after the conflict processing rule is applied, it changes to the UI display screen state shown in FIG. 14C by the example of the conflict process according to the setting change shown in steps 3070-1 to 3070-12.

That is, although the radio button 102 of the grouping (the member name of the internal structure is "Group") function has inherently been selected by the "finishing" setting sheet 100, by applying the conflict processing rule, the radio button 101 of the sorting (the member name of the internal structure 305 is "Collate") function is selected and it is changed to the ON state.

The processes as mentioned above are repetitively executed until a finishing process provided for the driver managing unit 306 is called by the application 201. When the finishing process of the printer driver 307 is called by the application 201, the information and the like of the conflict processing rules 301, 308, and 311 formed in the empty memory 202 are erased and other finishing processes are executed. Thus, all of the processes are finished, the processes of the printer driver 307 in the embodiment are also finished, and the information is erased from the RAM 2 by the function of the OS 205.

As described above, even if a plurality of plug-in modules 309 and 312 have been installed in the printer driver 307, the host computer 3000 in the embodiment refers to the conflict processing rule 308 of the first plug-in module 309 and the conflict processing rule 311 of the second plug-in module 312, so that the occurrence of the conflict between the settings in the printer driver 307 after the plug-in can be prevented.

That is, the host computer 3000 in the embodiment can execute the accurate conflict process even under the environment where a plurality of new functions have been added to the printer driver in the plug-in format.

When the plug-in module is uninstalled, the conflict processing rule file corresponding to this plug-in module is also deleted together with the plug-in module. When the plug-in module is installed, all of the information regarding the plug-in modules registered in the registry or the like on the OS which is operating in the host computer 3000 is deleted.

Although the case where two plug-in modules are installed has been described in the embodiment, naturally, the invention can be also applied to the case where two or more plug-in modules are installed.

Although the medium to record the printer driver 307 is used as an external memory 11 in the embodiment, an FD (flexible disk), an HD drive, a CD-ROM, an IC memory card, or the like can be used as an external memory 11. Further, it is also possible to construct in such a manner that the printer driver 307 is recorded in the ROM 3 solely or together with the OS 205 and other programs which operate on the host computer 3000, constructed as a part of the memory map, and directly executed by the CPU 1.

Further, although the programs to realize the various functions in the host computer 3000 are read out and stored into the memory (RAM) and the CPU executes the program, thereby realizing those functions in the foregoing embodiment, the invention is not limited to such an example. All or a part of the functions of the processes can be also realized by dedicated hardware. The foregoing memory can be also constructed by a magnetooptic disk device, a non-volatile memory such as a flash memory or the like, a read only recording medium such as a CD-ROM or the like, a volatile memory other than the RAM, or a computer-readable and writable recording medium according to a combination of them.

A construction of a data processing program which can be read by the data processing apparatus according to the invention will be described hereinbelow with reference to a memory map shown in FIG. 15.

Figure 15:
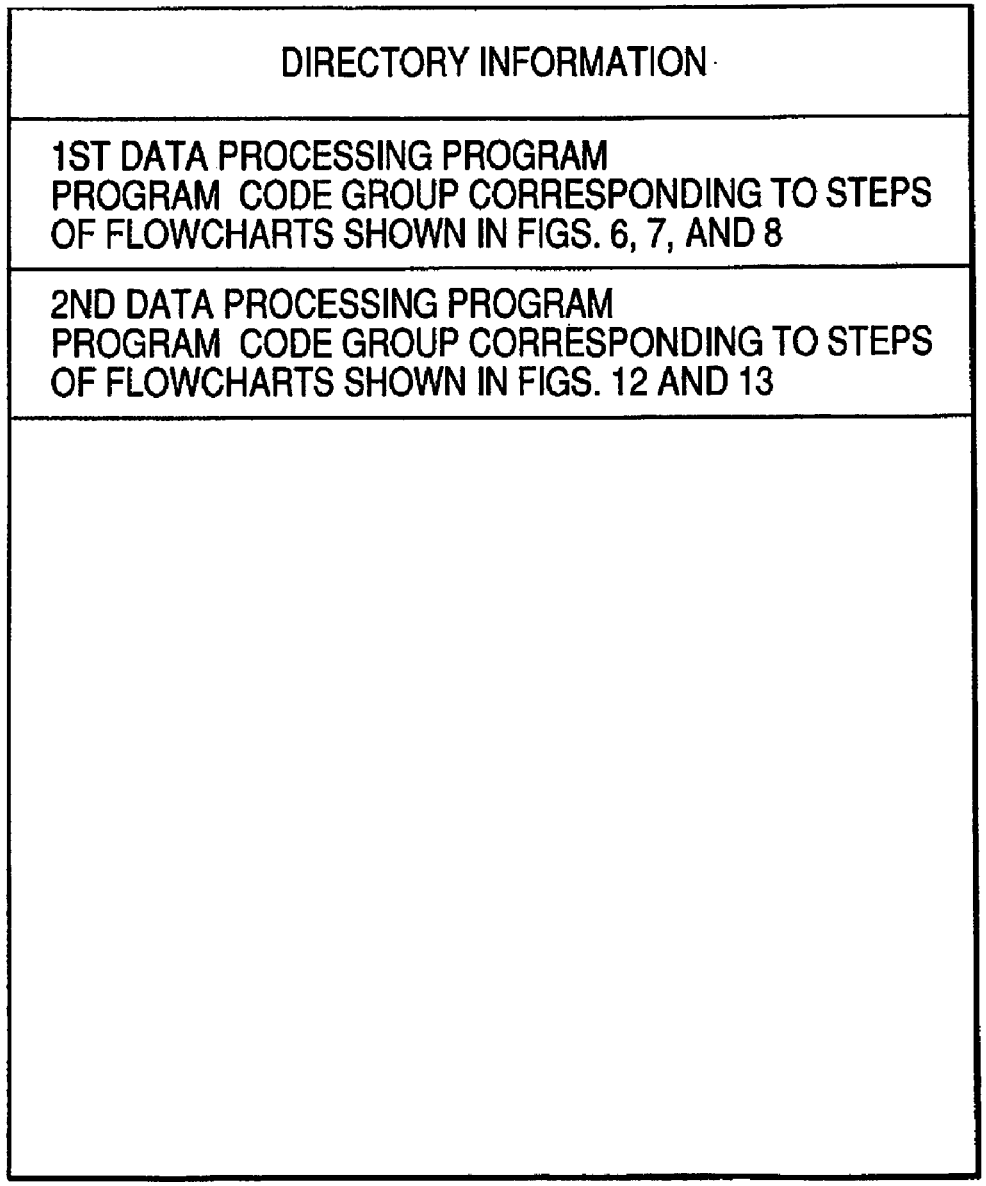
FIG. 15 is a diagram for explaining a memory map in a storing medium for storing various data processing programs which can be read by the data processing apparatus according to the invention.

FIG. 15 is a diagram for explaining a memory map in a storing medium for storing various data processing programs which can be read by the data processing apparatus according to the invention.

Although not shown, there is also a case where information to manage a program group which is stored in the storing medium, for example, version information, implementors, and the like are also stored and information which depends on the OS or the like of the program reading side, for example, icons or the like for identifying and displaying the programs are also stored.

Further, the data which belongs to various programs is also managed in the directory. There is also a case where a program to install the various. programs into the computer and if the program to be installed has been compressed, a program to decompress it and the like are also stored.

The functions shown in FIGS. 6, 7A, 7B, 8A, 8B, 12, and 13A and 13B in the embodiment can be also executed by the host computer in accordance with a program which is installed from the outside. In such a case, the invention is also applied to the case where an information group including the program is supplied to an output apparatus by a storing medium such as CD-ROM, flash memory, FD, or the like or from an external storing medium through the network.

Naturally, the object of the invention is also accomplished by a method whereby the storing medium in which program codes of software to realize the functions of the foregoing embodiment have been recorded as mentioned above is supplied to a system or an apparatus and a computer (or a CPU or an MPU) of the system or the apparatus reads out and executes the program codes stored in the storing medium.

In this case, the program codes themselves read out of the storing medium realize the novel functions of the invention and the storing medium in which the program codes have been stored constructs the invention.

Therefore, a form of the program is not limited and any of object codes, a program which is executed by an interpreter, script data which is supplied to the OS, and the like can be used so long as it has the functions of the program.

As a storing medium for supplying the program, for example, a flexible disk, a hard disk, an optical disk, a magnetooptic disk, an MO, a CD-ROM, a CD-R, a CD-RW, a magnetic tape, a non-volatile memory card, a ROM, a DVD, or the like can be used.

In this case, the program codes themselves read out of the storing medium realize the functions of the embodiments mentioned above and the storing medium in which the program codes have been stored constructs the invention.

As a supplying method of the program, the program can be also supplied by a method whereby a client computer is connected to Homepage on the Internet by using a browser of the client computer and the computer program itself of the invention is downloaded from Homepage or a method whereby a compressed file including an automatic installing function is downloaded to a recording medium such as a hard disk or the like. The program can be also supplied by a method whereby the program codes constructing the program of the invention are divided into a plurality of files and the divided files are downloaded from different Homepages. That is, a WWW server, an ftp server, and the like for downloading the program files to realize the functions and processes of the invention by the computer to a plurality of users are also incorporated in Claims of the invention.

The program supplying method can be also realized by a method whereby the program of the invention is encrypted, stored into the storing medium such as a CD-ROM or the like, and distributed to the users, the user who can clear predetermined conditions is allowed to download key information for decrypting the encryption from Homepage through the Internet, and the encrypted program is executed by using the key information and installed into the computer.

Naturally, the invention incorporates not only the case where the computer executes the read program codes, so that the functions of the embodiments mentioned above are realized but also the case where an OS (Operating System) or the like which is operating on the computer executes a part or all of actual processes on the basis of instructions of the program codes and the functions of the embodiment mentioned above are realized by those processes.

Further, the invention also incorporates the case where the program codes read out of the storing medium are written into a memory provided for a function expanding board inserted in the computer or for a function expanding unit connected to the computer and, after that, a CPU or the like provided for the function expanding board or the function expanding unit executes a part or all of actual processes on the basis of instructions of the program codes and the functions of the embodiments mentioned above are realized by those processes.

The invention is not limited to the foregoing embodiments but various modifications (including an organic combination of the embodiments) are possible on the basis of the spirit of the invention and they are not excluded from the scope of the invention.

It is also possible to construct in such a manner that the program to realize the functions for executing the various processes in the host computer 3000 is recorded into the computer-readable recording medium, the program recorded in the recording medium is read out and stored into a computer system and executed, thereby executing the processes. It is assumed that the "computer system" used here includes hardware such as OS, peripheral device, and the like.

The "computer-readable recording medium" denotes a portable medium such as flexible disk, magnetooptic disk, ROM, CD-ROM, or the like or a storing device such as a hard disk or the like which is built in the computer system. Further, it is assumed that the "computer-readable recording medium" includes a medium which holds the program for a predetermined time, such as a volatile memory (RAM) built in the computer system serving as a server or a client in the case where the program has been transmitted through a network such as Internet or the like or a communication line such as a telephone line or the like.

The program can be also transmitted to another computer system through a transmitting medium from the computer system in which the program has been stored in the storing device or the like or by a transmitting wave in the transmitting medium. The "transmitting medium" to transmit the program denotes a medium having a function for transmitting information like a network (communication network) such as Internet or the like or a communication line such as a telephone line or the like.

The program can be a program to realize a part of the foregoing functions. Further, it can be also a program which can realize the foregoing functions by a combination with the programs which have already been recorded in the computer system, that is, what is called a differential file (differential program).

A program product such as a computer-readable recording medium or the like in which the program has been recorded can be also applied as an embodiment of the invention. The foregoing program, recording medium, transmitting medium, and program product are also incorporated in the purview of the invention.

Although the embodiments of the invention have been described in detail above with reference to the drawings, the specific construction is not limited to the embodiments but design changes or the like in the scope of the invention without departing from the spirit of the invention are also incorporated.

Although the various examples and embodiments of the invention have been described, it will be obviously understood to those skilled in the art that the spirit and scope of the invention are not limited to the specific description in the specification but the following embodiments are also incorporated.

A data processing apparatus which can further add a plurality of expanding functions to a function that can be realized by a print processing related program, comprises:

a first rule storage unit (for example, external memory 11 shown in FIG. 1) adapted to store a first conflict processing rule (conflict processing rule 308 shown in FIG. 4) which has been determined in accordance with a dependence relation that is satisfied between two or more setting values;

a second rule storage unit (for example, external memory 11 shown in FIG. 1) adapted to store a second conflict processing rule (conflict processing rule 311 shown in FIG. 4) which has been determined in accordance with a dependence relation that is satisfied between the setting values which are inputted to the function of the print processing related program and to the plurality of expanding functions; and a setting adjustment unit (conflict manager 303 of the printer driver 307 shown in FIG. 3) adapted to read the first conflict processing rule and the second conflict processing rule from the first rule storage unit and the second rule storage unit and execute an adjusting process of the setting values on the basis of the read first and second conflict processing rules so that no conflict occurs between any two settings of the plurality of functions and the plurality of expanding functions.

Thus, even in the data processing environment where a plurality of new functions have been added to the print processing related program (printer driver) in the plug-in format, it is possible to freely construct the print setting environment where the conflict state accompanied by each function unique setting is discriminated, the automatic and accurate conflict process is realized, even when the function unique settings are in the conflict state, the environment is automatically adjusted to the print setting environment in which the normal printing can be executed, the print setting for the plurality of functions which are added is normally performed, and the desired print result can be normally obtained.

A confirmation unit (conflict manager 303 of the printer driver 307 shown in FIG. 3) adapted to confirm whether or not the second conflict processing rule has been stored in the second rule storage unit in the case where the plurality of expanding functions have been added may be also provided.

By this confirmation unit, the second conflict processing rule corresponding to the plug-in module to the expanding function which is added can be certainly read.

The setting adjustment unit may apply the first conflict processing rule and the second conflict processing rule in order of the higher priority and execute the adjusting process of the settings so that no conflict occurs between any two settings of the plurality of functions and the plurality of expanding functions.

Thus, the inconsistent settings between the setting functions of the printer driver and the expanding functions which are added can be automatically adjusted.

The data processing apparatus may further have: a display unit (CRT 10 shown in FIG. 1) adapted to display various kinds of information; and a display screen display unit (printer driver 307 shown in FIG. 3) adapted to display a setting state display screen, onto the display unit, by which the user can visually confirm the setting states of the plurality of functions and the plurality of expanding functions, wherein the setting state display screen which is displayed onto the display unit by the display screen display unit shows the setting states after the adjusting process of the settings was executed by the setting adjustment unit.

Thus, it is possible to enable the user to confirm the changed setting states where the settings of the plurality of expanding functions and the printer driver have been adjusted.

In the setting state display screen which is displayed onto the display unit by the display screen display unit, the settings of the plurality of functions and the plurality of additional functions can be changed by the user's operation, in the case where the user changed the settings of one or a plurality of functions or the plurality of additional functions, the setting adjustment unit may execute the adjusting process of the settings on the basis of the read first and second conflict processing rules so that no conflict occurs between any two settings of the plurality of functions and the plurality of expanding functions after the change.

Thus, the setting states are adjusted for the user's settings in consideration of the consistency between the settings of the printer driver and the function settings, and even if the user made the settings which cause conflict, the setting states which avoid the conflict can be displayed.

This application claims priority from Japanese Patent Application No. 2004-330474 filed on Nov. 15, 2004, which is hereby incorporated by reference herein.

What is claimed is:

1. A data processing apparatus in which a printer driver has been installed, comprising:

a first rule storage unit adapted to store a first conflict processing rule which defines a dependence relation satisfied among a plurality of setting values which are used for a print process and which are related to original functions of the printer driver;

a control unit adapted to control installation of a plurality of module sets for expanding the original functions of the printer driver, the plurality of module sets including a plug-in module for expanding a user interface driver and a graphics driver of the printer driver and a second conflict processing rule corresponding to the plug-in module, the second conflict processing rule defining a dependence relation satisfied among a plurality of setting values related to the original functions of the printer driver and related to additional functions of the plug-in module included in the plurality of module sets;

a second rule storage unit adapted to store the second conflict processing rule included in the plurality of module sets installed under control by the control unit; and an adjustment unit adapted to execute an adjusting process on the basis of the first and second conflict processing rules stored by said first and second rule storage units, respectively, so that no conflict occurs among a plurality of setting values related to the original functions of the printer driver and a plurality of setting values related to the additional functions of the plug-in module, wherein the adjustment unit executes the adjusting process on the basis of the second conflict processing rule stored by the second rule storage units so that no conflict occurs among a plurality of setting values related to the additional functions of the plug-in module.

2. An apparatus according to claim 1, further comprising a confirmation unit adapted to confirm whether or not the second conflict processing rule has been stored in said second rule storage unit.

3. An apparatus according to claim 1, wherein said adjustment unit applies the first conflict processing rule and the second conflict processing rule in order of a higher priority and executes the adjusting process of the settings so that no conflict occurs among the plurality of settings.

4. An apparatus according to claim 1, further comprising a display screen display unit adapted to display a setting state display screen by which a user can visually confirm setting values of the original functions of the printer driver and the additional functions of the plug-in module, and wherein the setting state display screen which is displayed by said display screen display unit shows the setting states after the adjusting process of the settings was executed by said adjustment unit.

5. An apparatus according to claim 1, wherein the plurality of module sets include a document management program and a tint-block-printing module, wherein said apparatus further comprises an obtaining unit of obtaining a plurality of second conflict processing rules from the document management program and the tint- block-printing module, wherein the second rule storage unit stores the plurality of second conflict processing rules obtained by the obtaining unit, and wherein the adjustment unit executes the adjusting process on the basis of the plurality of second conflict processing rules stored by the second rule storage unit for inhibiting setting of a mode of storing document at the document management program when the tint-block printing mode is set to the tint-block printing program.

6. A setting processing method in a data processing apparatus in which a printer driver has been installed, comprising:
 a first rule storage step of storing a first conflict processing rule which defines a dependence relation satisfied among a plurality of setting values which are used for a print process and which are related to original functions of the printer driver;
 a control step adapted to control installation of a plurality of module sets for expanding the original functions of the printer driver, the plurality of module sets including a plug-in module for expanding a UI driver and a graphics driver of the printer driver and a second conflict processing rule corresponding to the plug-in module, the second conflict processing rule defining a dependence relation satisfied among a plurality of setting values related to the original functions of the printer driver and related to additional functions of the plug-in module included in the plurality of module sets;
 a second rule storage step of storing the second conflict processing rule included in the plurality of module sets installed under control by the control step; and
 an adjustment step of reading out the first conflict processing rule and the second conflict processing rule stored in said first rule storage step and said second rule storage step and executing an adjusting process on the basis of the first and second conflict processing rules stored by said first and second rule storage steps, respectively, so that no conflict occurs among a plurality of setting values related to the original functions of the printer driver and a plurality of setting values related to the additional functions of the plug-in module, wherein the adjustment step executes the adjusting process on the basis of the second conflict processing rule stored by the second rule storage steps so that no conflict occurs among a plurality of setting values related to the additional functions of the plug-in module.

7. A method according to claim 6, further comprising a confirmation step of confirming whether or not the second conflict processing rule has been stored in said second rule storage step.

8. A method according to claim 6, wherein in said adjustment step, the first conflict processing rule and the second conflict processing rule are applied in order of a higher priority and the adjusting process of the settings is executed so that no conflict occurs among the plurality of settings.

9. A method according to claim 6, further comprising a display screen display step of displaying a setting state display screen by which a user can visually confirm setting states of the original functions of the printer driver and the additional functions of the plug-in module, and
 wherein the setting state display screen which is displayed in said display screen display step shows the setting states after the adjusting process of the settings was executed in said adjustment step.

10. A method according to claim 6, wherein the plurality of module sets include a document management program and a tint-block-printing module, wherein said method further comprises an obtaining step of obtaining a plurality of second conflict processing rules from the document management program and the tint-block-printing module, wherein the second rule storage step stores the plurality of second conflict processing rules obtained by the obtaining step, and wherein the adjustment step executes the adjusting process on the basis of the plurality of second conflict processing rules stored by the second rule storage step of inhibiting setting of a mode of storing document at the document management program when the tint-block printing mode is set to the tint-block printing program.

11. A non-transitory computer-readable storage medium storing a computer program executable by a data processing apparatus in which a printer driver has been installed, the computer program comprising:
 a first rule storage step of storing a first conflict processing rule which defines a dependence relation satisfied among a plurality of setting values which are used for a print process and which are related to original functions of the printer driver;
 a control step adapted to control installation of a plurality of module sets for expanding the original functions of the printer driver, the plurality of module sets including a plug-in module for expanding a UI driver and a graphics driver of the printer driver and a second conflict processing rule corresponding to the plug-in module, the second conflict processing rule defining a dependence relation satisfied among a plurality of setting values related to the original functions of the printer driver and related to additional functions of the plug-in module included in the plurality of module sets;
 a second rule storage step of storing the second conflict processing rule included in the plurality of module sets installed under control by the control step; and
 an adjustment step of reading out the first conflict processing rule and the second conflict processing rule stored in said first rule storage step and said second rule storage step and executing an adjusting process on the basis of the first and second conflict processing rules stored by said first and second rule storage steps, respectively, so that no conflict occurs among a plurality of setting values related to the original functions of the printer driver and a plurality of setting values related to the additional functions of the plug-in module, wherein the adjustment step executes the adjusting process on the basis of the second conflict processing rule stored by the second rule storage steps so that no conflict occurs among a plurality of setting values related to the additional functions of the plug-in module.

* * * * *